US012026901B2

(12) United States Patent
Evangelista et al.

(10) Patent No.: US 12,026,901 B2
(45) Date of Patent: Jul. 2, 2024

(54) EFFICIENT ENCODING OF DEPTH DATA ACROSS DEVICES

(71) Applicant: Samsung Electronics Co., Ltd., Suwon-si (KR)

(72) Inventors: Edgar C. Evangelista, San Jose, CA (US); Aaron S. Faucher, San Mateo, CA (US); Jaehyun Kim, San Francisco, CA (US); Andrew R McHugh, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 17/361,143

(22) Filed: Jun. 28, 2021

(65) Prior Publication Data

US 2022/0005215 A1 Jan. 6, 2022

Related U.S. Application Data

(60) Provisional application No. 63/047,142, filed on Jul. 1, 2020.

(51) Int. Cl.

*G06T 7/55* (2017.01)
*G02B 27/01* (2006.01)

(Continued)

(52) U.S. Cl.

CPC .............. *G06T 7/55* (2017.01); *G02B 27/017* (2013.01); *G06T 7/70* (2017.01); *H04N 19/597* (2014.11);

(Continued)

(58) Field of Classification Search

CPC ........... G06T 7/55; G06T 7/70; G02B 27/017; G02B 2027/0138; G02B 2027/0178; G02B 2027/0187; H04N 19/597

See application file for complete search history.

(56) References Cited

U.S. PATENT DOCUMENTS 8,379,101 B2 2/2013 Mathe et al.
8,416,276 B2 4/2013 Kroll et al.

(Continued)

FOREIGN PATENT DOCUMENTS

EP 2880858 B1 6/2020
JP 2020-136921 A 8/2020

(Continued)

OTHER PUBLICATIONS

International Search Report & Written Opinion dated Mar. 18, 2022 for International Application PCT/KR2021/013516 from Korean Intellectual Property Office, pp. 1-11, Republic of Korea.

(Continued)

*Primary Examiner* — Diane D Mizrahi

(74) *Attorney, Agent, or Firm* — Sherman IP LLP; Kenneth L. Sherman; Steven Laut

(57) ABSTRACT

One embodiment provides a method comprising determining a spatial relationship between an augmented reality (AR) device and a camera-equipped device. The AR device is worn by a user. The camera-equipped device is positioned within proximity of the user. The method comprises determining, based on the spatial relationship, minimum and maximum boundaries of a user volume encompassing a head and one or more extremities of the user. The minimum and maximum boundaries represent a reduced depth range that is narrower than a full depth range of a camera frustum of the camera-equipped device. The method further comprises encoding, based on the minimum and maximum boundaries, a depth image frame captured via the camera-equipped device, and transmitting the encoded depth image frame over a remote network connection. A reconstructed 3D image based in part on the encoded depth image frame is rendered by a different AR device.

20 Claims, 16 Drawing Sheets

(51) Int. Cl.
*G06T 7/70* (2017.01)
*H04N 19/597* (2014.01)

(52) U.S. Cl.
CPC ................ *G02B 2027/0138* (2013.01); *G02B 2027/0178* (2013.01); *G02B 2027/0187* (2013.01)

(56) References Cited

U.S. PATENT DOCUMENTS

| | | | | |
|---|---|---|---|---|
| 8,970,656 | B2 | 3/2015 | Goodman et al. | |
| 9,310,612 | B2 | 4/2016 | Cho et al. | |
| 9,417,754 | B2 * | 8/2016 | Smith | G06F 3/04886 |
| 9,727,473 | B2 | 8/2017 | Dees et al. | |
| 9,728,010 | B2 | 8/2017 | Thomas et al. | |
| 9,838,573 | B2 | 12/2017 | Choi et al. | |
| 10,175,483 | B2 | 1/2019 | Salter et al. | |
| 10,175,492 | B2 | 1/2019 | Li et al. | |
| 10,354,449 | B2 | 7/2019 | Todeschini | |
| 10,546,181 | B2 | 1/2020 | Schickel et al. | |
| 10,757,368 | B2 | 8/2020 | Lyren | |
| 2012/0309532 | A1 | 12/2012 | Ambrus et al. | |
| 2015/0070274 | A1 | 3/2015 | Morozov | |
| 2015/0215581 | A1 | 7/2015 | Barzuza et al. | |
| 2016/0027212 | A1 | 1/2016 | Da Veiga et al. | |
| 2017/0069071 | A1 | 3/2017 | Jung | |
| 2019/0320144 | A1 | 10/2019 | Tong et al. | |
| 2019/0342507 | A1 | 11/2019 | Dye et al. | |
| 2020/0265627 | A1 | 8/2020 | Seo et al. | |
| 2021/0209853 | A1 | 7/2021 | Min et al. | |
| 2021/0382544 | A1 | 12/2021 | Butcher et al. | |
| 2021/0407215 | A1 | 12/2021 | Evangelista et al. | |

FOREIGN PATENT DOCUMENTS

| | | | |
|---|---|---|---|
| JP | 2020184695 | A | 11/2020 |
| KR | 2016-0133230 | A | 11/2016 |
| KR | 1705025 | B1 | 2/2017 |
| KR | 20180038175 | A | 4/2018 |
| KR | 20190087764 | A | 7/2019 |
| WO | 2017/065348 | A1 | 4/2017 |
| WO | 2018/106198 | A1 | 6/2018 |

OTHER PUBLICATIONS

U.S. Ex Parte Quayle Action for U.S. Appl. No. 17/361,153 dated Apr. 1, 2022 by Examiner Charles Tseng.

Pece, F. et al., "Adapting Standard Video Codecs for Depth Streaming", Joint Virtual Reality Conference of EuroVR—EGVE, 2011, 4 pages, downloaded Jun. 28, 2021 from: http://reality.cs.ucl.ac.uk/projects/depth-streaming/depth-streaming.pdf, The Eurographics Association.

Wilson, A.D., "Fast Lossless Depth Image Compression", Oct. 17, 2017, p. 100-105, downloaded Jun. 28, 2021 from: https://www.microsoft.com/en-us/research/uploads/prod/2018/09/p100-wilson.pdf, ACM, United Kingdom.

Finley, M.G., "Variable precision depth encoding for 3D range geometry compression", 2020, pp. 5290-5299, vol. 59, issue 17, downloaded Jun. 28, 2021 at https://www.osapublishing.org/ao/abstract.cfm?url=ao-59-17-5290 (Abstract Only).

Reed, N., "Depth Precision Visualized", Jul. 15, 2015, 4 pages, downloaded Jun. 28, 2021 from: https://developer.nvidia.com/content/depth-precision-visualized, NVIDIA Developer.

International Search Report & Written Opinion dated Oct. 12, 2021 for International Application PCT/KR2021/008355 from Korean Intellectual Property Office, pp. 1-9, Republic of Korea.

U.S. Notice of Allowance for U.S. Appl. No. 17/361,153 dated Jun. 13, 2022 by Examiner Charles Tseng.

U.S. Corrected Notice of Allowability for U.S. Appl. No. 17/361,153 dated Jun. 27, 2022 by Examiner Charles Tseng.

* cited by examiner

550

200

300

560

570

800

- Determining a spatial relationship between an augmented reality (AR) device and a camera-equipped device, where the AR device is worn by a user, and the camera-equipped device is positioned within proximity of the user — 810

- Determining, based on the spatial relationship, minimum and maximum boundaries of a user volume encompassing a head and one or more extremities of the user, where the minimum and maximum boundaries represent a reduced depth range that is narrower than a full depth range of a camera frustrum of the camera-equipped device — 820

- Encoding, based on the minimum and maximum boundaries, a depth image frame captured via the camera-equipped device — 830

- Transmitting the encoded depth image frame over a remote network connection, wherein a reconstructed 3D image based in part on the encoded depth image frame is rendered by a different AR device — 840

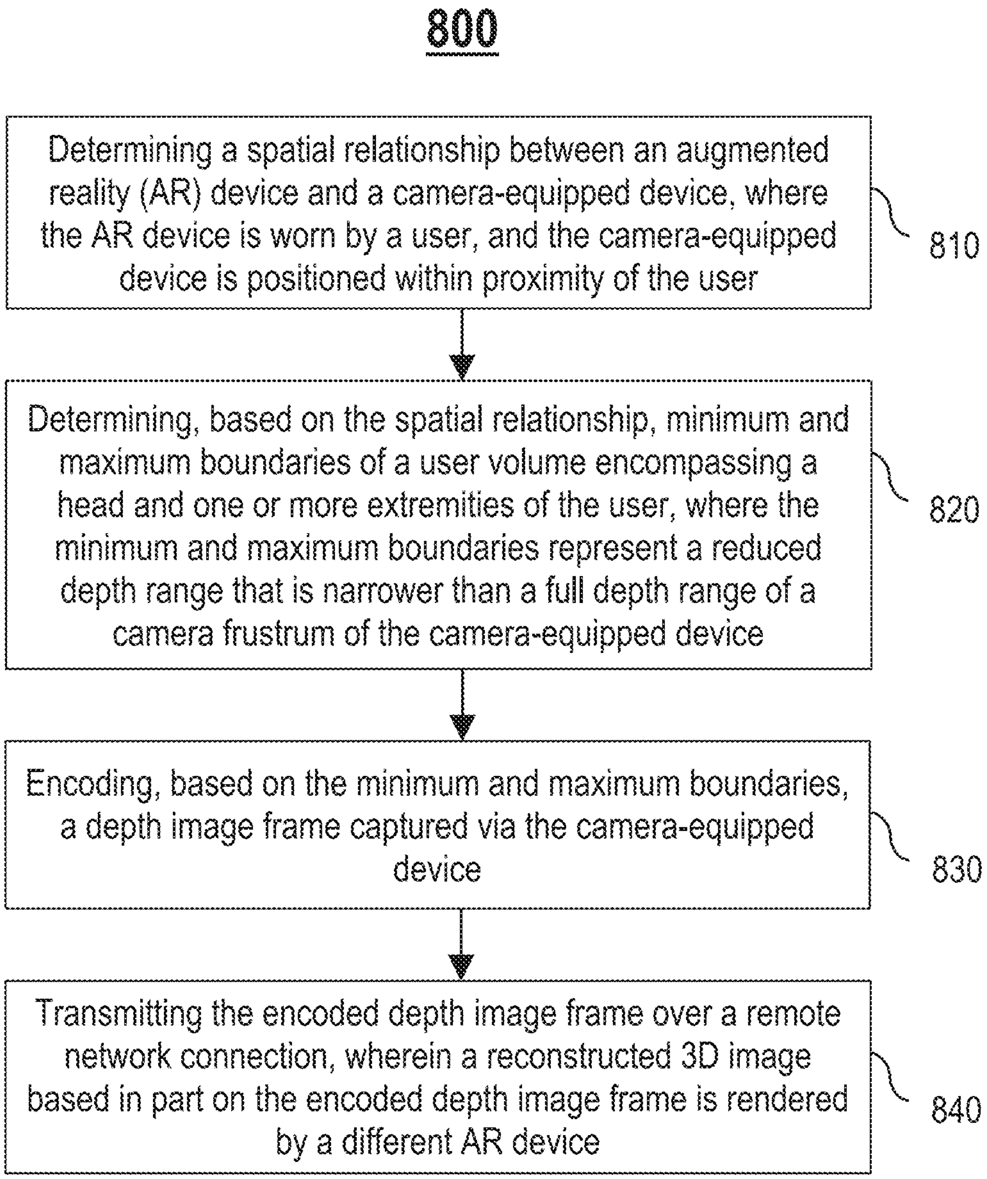

FIG. 13

EFFICIENT ENCODING OF DEPTH DATA ACROSS DEVICES

CROSS REFERENCE TO RELATED APPLICATIONS

This application claims priority from U.S. Provisional Patent Application Ser. No. 63/047,142, filed on Jul. 1, 2020, incorporated herein by reference.

TECHNICAL FIELD

One or more embodiments relate generally to augmented reality, and in particular, generating efficient encoding of depth data across devices.

BACKGROUND

Augmented reality (AR) is an enhanced version of the real physical world that is achieved through the use of digital visual elements, sound, or other sensory stimuli delivered via technology.

SUMMARY

One embodiment provides a method comprising determining a spatial relationship between an augmented reality (AR) device and a camera-equipped device. The AR device is worn by a user. The camera-equipped device is positioned within proximity of the user. The method comprises determining, based on the spatial relationship, minimum and maximum boundaries of a user volume encompassing a head and one or more extremities of the user. The minimum and maximum boundaries represent a reduced depth range that is narrower than a full depth range of a camera frustum of the camera-equipped device. The method further comprises encoding, based on the minimum and maximum boundaries, a depth image frame captured via the camera-equipped device, and transmitting the encoded depth image frame over a remote network connection. A reconstructed three dimensional (3D) image based in part on the encoded depth image frame is rendered by a different AR device.

These and other features, aspects and advantages of the one or more embodiments will become understood with reference to the following description, appended claims and accompanying figures.

BRIEF DESCRIPTION OF THE DRAWINGS

FIG. 13 is a flowchart of an example process for efficient encoding of depth data across devices, in one or more embodiments.

DETAILED DESCRIPTION

Figure 1:
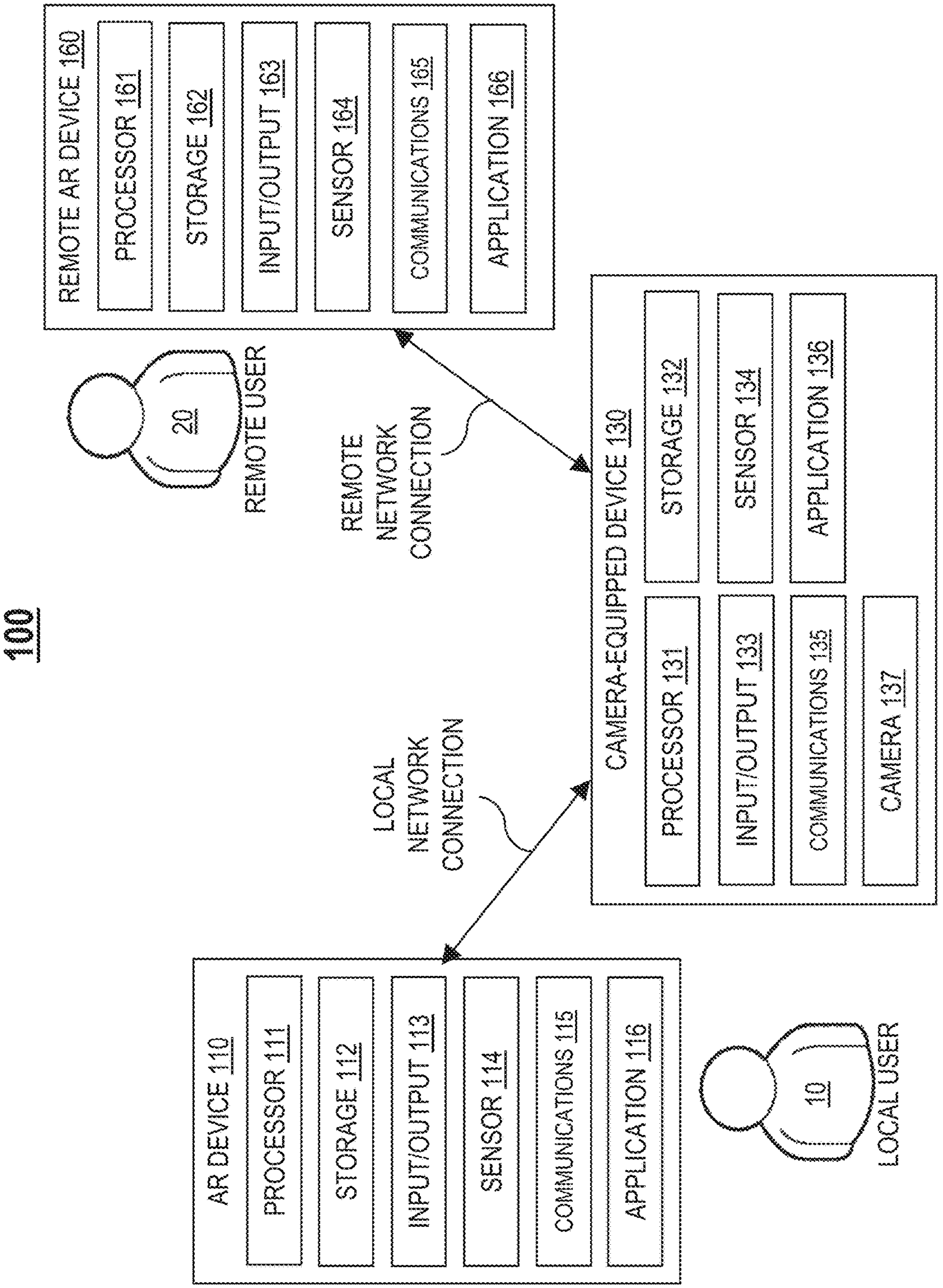
FIG. 1 illustrates an example computing architecture for implementing efficient encoding of depth data across devices, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to augmented reality, and in particular, generating efficient encoding of depth data across devices. One embodiment provides a method comprising determining a spatial relationship between an augmented reality (AR) device and a camera-equipped device. The AR device is worn by a user. The camera-equipped device is positioned within proximity of the user. The method comprises determining, based on the spatial relationship, minimum and maximum boundaries of a user volume encompassing a head and one or more extremities of the user. The minimum and maximum boundaries represent a reduced depth range that is narrower than a full depth range of a camera frustum of the camera-equipped device. The method further comprises encoding, based on the minimum and maximum boundaries, a depth image frame captured via the camera-equipped device, and transmitting the encoded depth image frame over a remote network connection. A reconstructed 3D image based in part on the encoded depth image frame is rendered by a different AR device.

For expository purposes, the term "video call" as used in this specification generally refers to reception and transmission of audio-video signals by users in different locations, for communication between people in real time.

Holographic calls ("holocalls") are example augmented reality (AR) application use cases that involve AR, immersive, volumetric video calls between multiple users. A holocall involves streaming Red, Green and Blue (RGB) and depth image frames from a first device to a second device across a network. A holographic call typically involves an AR/virtual reality (AR/VR) headset and a mobile phone. One user captures real-time images of themselves via a camera of the mobile phone, and another user views the user in stereoscopic 3D via the AR/VR headset. For example, the AR/VR headset renders images of the user at a streaming rate of about 30 feet per second (fps) to enable holocalls to become more broadly available as a consumer product, 3D data about a user must be encoded efficiently to allow for low-latency transport of information about the user across a wide variety of network conditions.

Lossy codecs (i.e., lossless methods), such as H264/H265 (interframe) or Joint Photographic Experts Group (JPEG) (intraframe), are desirable as such codecs allow for fluctuations in quality given network conditions. Existing lossless depth compression algorithms, however, are inflexible with respect to handling fluctuations in quality given network conditions.

To improve perceptual quality of video depth while streaming, conventional technologies reduce full range of depth values (i.e., values of depth image frames). Quantizing the full range of depth values, however, results in more artifacts in regions of the face and/or body rendered in an AR/VR display of the AR/VR headset.

In the context of AR holographic calls, existing computer vision/artificial intelligence CV/AI)-based methods for determining a relevant range of values that a user occupies are not the most effective. For example, in terms of computational costs, processing time increases for higher-resolution images when utilizing AI-based methods for real-time human segmentation (e.g., DeepLab3). If a pair of AR glasses is responsible for rendering images at 60 fps, processing time may be better allocated for rendering. Further, AI-based methods for real-time human segmentation perform less well when part of the face is occluded by sunglasses or a large AR/VR headset, resulting in video streaming instability for users with occluded faces and/or in noisy environments.

One or more embodiments provide a system for improving efficiency of transporting depth image frames across a network. In one embodiment, the system is configured to track a position of a device (e.g., a mobile phone) and a position of a user of the device, and automatically adjust encoding of 3D data about the user, such as depth image frames captured by the device, to a volume around the user based on the tracked positions. The resulting encoded 3D data is transported from the device across the network with low-latency.

In one embodiment, to improve perceptual quality of video depth while streaming, the system reduces a quantization error associated with quantizing depth range (i.e., range of depth values). To reduce the quantization error, the system determines a range of depth values that the user occupies.

One or more embodiments are compatible with existing image/video lossy codecs or lossless depth compression techniques, such as JPEG or H264/H265.

One embodiment provides a single calibration-based method for improving the efficiency and accuracy of person-centric depth data transmission in the context of holocalls.

FIG. 1 illustrates an example computing architecture 100 for implementing efficient encoding of depth data across devices, in one or more embodiments. The computer architecture 100 provides a framework for a holocall between a local user 10 and a remote user 20. In the environment of the local user 10, the computer architecture 100 comprises at least an AR device 110 and a camera-equipped device 130. The AR device 110 and the camera-equipped device 130 are paired devices. In the environment of the remote user 20, the computer architecture 100 comprises at least a remote AR device 160.

The AR device 110 includes resources, such as one or more processor units 111 and one or more storage units 112. One or more applications 116 may execute/operate on the AR device 110 utilizing the resources of the AR device 110. In one embodiment, the AR device 110 comprises one or more sensor units 114 integrated in or coupled to the AR device 110, such as a global positioning system (GPS), a motion sensor, etc. In one embodiment, the AR device 110 comprises one or more input/output (I/O) units 113 integrated in or coupled to the AR device 110. In one embodiment, the one or more I/O units 113 include, but are not limited to, an AR display, etc. Examples of an AR device 110 include, but are not limited to, a pair of AR glasses, an AR headset, etc. During the holocall, the AR device 110 is worn by the local user 10.

In one embodiment, the AR device 110 comprises a communications unit 115 configured to exchange data with the camera-equipped device 130 over a local network connection (e.g., a wireless connection such as a wireless Institute of Electrical and Electronics Engineers (IEEE) 802.11x standard (Wi-Fi) connection or a cellular data connection, a wired connection, or a combination of the two). The communications unit 115 may comprise any suitable communications circuitry operative to connect to a communications network and to exchange communications operations and media between the AR device 110 and other devices connected to the same communications network. The communications unit 115 may be operative to interface with a communications network using any suitable communications protocol such as, for example, Wi-Fi (e.g., an IEEE 802.11 protocol), BLUETOOTH®, high frequency systems (e.g., 900 Megahertz (MHz), 2.4 Gigahertz (GHz), and 5.6 GHz communication systems), infrared, Global System for Mobile Communication (GSM), GSM plus Enhanced Data Rate for GSM Evolution (EDGE), Code Division Multiple Access (CDMA), quadband, and other cellular protocols, Voice Over Internet Protocol (VOIP), Transmission Control Protocol-IP (TCP-IP), or any other suitable protocol.

The camera-equipped device 130 includes resources, such as one or more processor units 131 and one or more storage units 132. One or more applications 136 may execute/operate on the camera-equipped device 130 utilizing the resources of the camera-equipped device 130. In one embodiment, the camera-equipped device 130 comprises one or more sensor units 134 integrated in or coupled to the camera-equipped device 130, such as a camera 137, a microphone, a GPS, a motion sensor, etc. In one embodiment, the camera-equipped device 130 comprises one or more I/O units 133 integrated in or coupled to the camera-equipped device 130. In one embodiment, the one or more I/O units 133 include, but are not limited to, a physical user interface (PUI) and/or a Graphical User Interface (GUI), such as a keyboard, a keypad, a touch interface, a touch screen, a knob, a button, a display screen, etc. In one embodiment, the local user 10 can utilize at least one I/O unit 133 to configure one or more user preferences, configure one or more parameters, provide input, etc. Examples of a camera-equipped device 130 include, but are not limited to, a television (e.g., a smart television), a mobile electronic device (e.g., a tablet, a smart phone, a laptop, etc.), a wearable device (e.g., a smart watch, a smart band, a head-mounted display, smart glasses, etc.), an Internet of things (IoT) device, etc.

Figure 6:
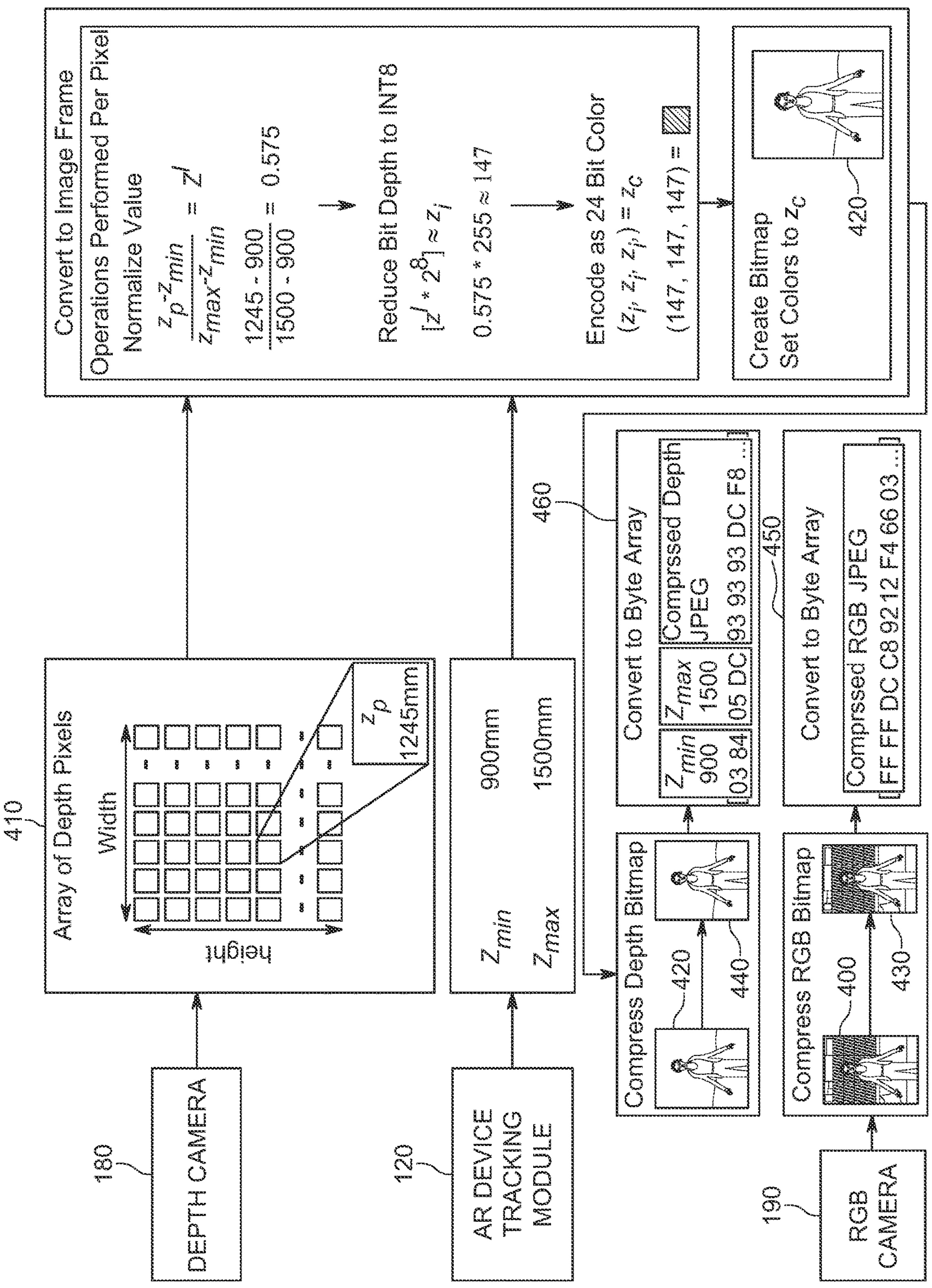
FIG. 6 illustrates an example encoding process, in one or more embodiments.

In one embodiment, the camera 137 includes both a depth camera 180 (FIG. 6) and a RGB camera 190 (FIG. 6). During the holocall, the camera-equipped device 130 is positioned within proximity of the local user 10 to capture RGB and depth image frames of the local user 10.

In one embodiment, the camera-equipped device 130 comprises a communications unit 135 configured to exchange data with the AR device 110 over a local network connection (e.g., a wireless connection such as a Wi-Fi connection or a cellular data connection, a wired connection, or a combination of the two). The communications unit 135 is further configured to exchange data with a remote device, such as the remote AR device 160, over a remote network connection (e.g., a wireless connection such as a Wi-Fi connection or a cellular data connection, a wired connection, or a combination of the two). The communications unit 135 may comprise any suitable communications circuitry operative to connect to a communications network and to exchange communications operations and media between the camera-equipped device 130 and other devices connected to the same communications network. The communications unit 135 may be operative to interface with a communications network using any suitable communications protocol such as, for example, Wi-Fi (e.g., an IEEE 802.11 protocol), BLUETOOTH®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the one or more applications 136 on the camera-equipped device 130 may further include one or more software mobile applications loaded onto or downloaded to the camera-equipped device 130, such as a camera application, a social media application, a video streaming application, an AR application, etc.

The remote AR device 160 includes resources, such as one or more processor units 161 and one or more storage units 162. One or more applications 166 may execute/operate on the remote AR device 160 utilizing the resources of the remote AR device 160. In one embodiment, the remote AR device 160 comprises one or more sensor units 164 integrated in or coupled to the remote AR device 160, such as a GPS, a motion sensor, etc. In one embodiment, the remote AR device 160 comprises one or more I/O units 163 integrated in or coupled to the remote AR device 160. In one embodiment, the one or more I/O units 163 include, but are not limited to, an AR display, etc. Examples of a remote AR device 160 include, but are not limited to, a pair of AR glasses, an AR headset, etc. During the holocall, the remote AR device 160 is worn by the remote user 20.

In one embodiment, the remote AR device 160 comprises a communications unit 165 configured to exchange data with the camera-equipped device 130 over the remote network connection. The communications unit 165 may comprise any suitable communications circuitry operative to connect to a communications network and to exchange communications operations and media between the remote AR device 160 and other devices connected to the same communications network. The communications unit 165 may be operative to interface with a communications network using any suitable communications protocol such as, for example, Wi-Fi (e.g., an IEEE 802.11 protocol), BLUETOOTH®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

Figure 2:
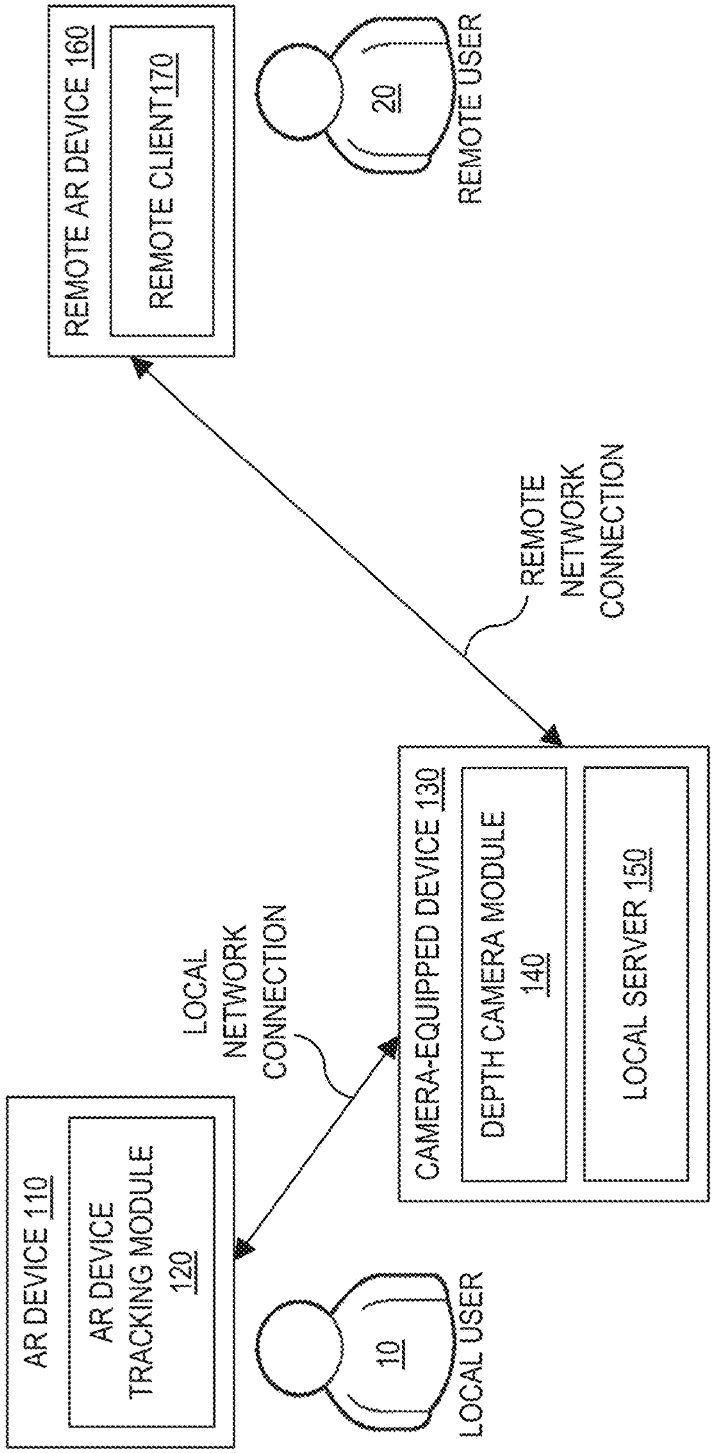
FIG. 2 illustrates an example system for efficient encoding of depth data across devices, in one or more embodiments.

FIG. 2 illustrates an example system 550 for efficient encoding of depth data across devices, in one or more embodiments. In one embodiment, the system 550 comprises: (1) an AR device tracking module 120, (2) a depth camera module 140, (3) a local server 150, and (4) a remote client 170. As shown in FIG. 2, in one embodiment, the one or more applications 116 (FIG. 1) on the AR device 100 include the AR device tracking module 120, the one or more applications 136 (FIG. 1) on the camera-equipped device 130 include the depth camera module 140 and the local server 150, and the one or more applications 166 (FIG. 1) on the remote AR device 160 include the remote client 170.

In one embodiment, the AR device tracking module 120 is configured to perform an initial calibration against a position of the camera-equipped device 130 to determine a spatial relationship between the paired devices. During the holocall, for each depth image frame, the AR device tracking module 120 is further configured to: (1) track positions of different parts of the local user 10, wherein the different parts include the head and one or more extremities (e.g., hands, feet) of the local user 10, and (2) determine, based on the positions tracked, a reduced depth range for the depth image frame. A reduced depth range is narrower than a full depth range (i.e., all depth values within the frustum of the camera 137). The reduced depth range contains only relevant depth values, i.e., depth values representing a volume the local user 10 ("user volume") occupies, wherein the user volume encompasses most of the body of the local user 10 including the different parts tracked. The AR device tracking module 120 tracks the different parts of the local user 10 to dynamically update the relevant range of depth values for each depth image frame.

In one embodiment, during the holocall, for each depth image frame, the AR device tracking module 120 is further configured to: (1) track additional positions of different elements in the environment of the local user 10, wherein the different elements include one or more images or objects within proximity of the local user 10, and (2) determine, based on the additional positions tracked, a reduced depth range for the depth image frame. In one embodiment, the one or more images or objects are tracked optically or via other means utilizing either the camera 137 or the AR device 110. The additional positions tracked may expand the reduced depth range (i.e., expand minimum and maximum boundaries).

In one embodiment, the depth camera module 140 is configured to capture, via the camera 137, RGB and depth image frames of the local user 10 during the holocall.

In one embodiment, the depth camera module 140 is further configured to perform an encoding process that encodes each depth image frame captured based on a reduced depth range (determined via the AR device tracking module 120) in the depth image frame.

In one embodiment, the depth camera module 140 is further configured to apply a lossy codec (e.g., JPEG, H264, or H265) to each RGB image frame captured and each resulting encoded depth image frame to better accommodate network bandwidth constraints.

In one embodiment, the local server 150 is configured to send/relay a compressed RGB image frame and a compressed, encoded depth image frame (compressed via the depth camera module 140) to the remote client 170 as an output stream transported over the remote network connection.

In one embodiment, the remote client 170 is configured to: (1) receive an input stream from the local server 150 over the remote network connection, (2) perform a decoding process on an encoded depth image frame included in the input stream to decode a reduced depth range in the depth image frame, (3) reconstruct a 3D image of the local user 10 based a RGB image frame included in the input stream and the reduced depth range, and (4) render the resulting 3D image on an AR display of the remote AR device 160.

Figure 3:
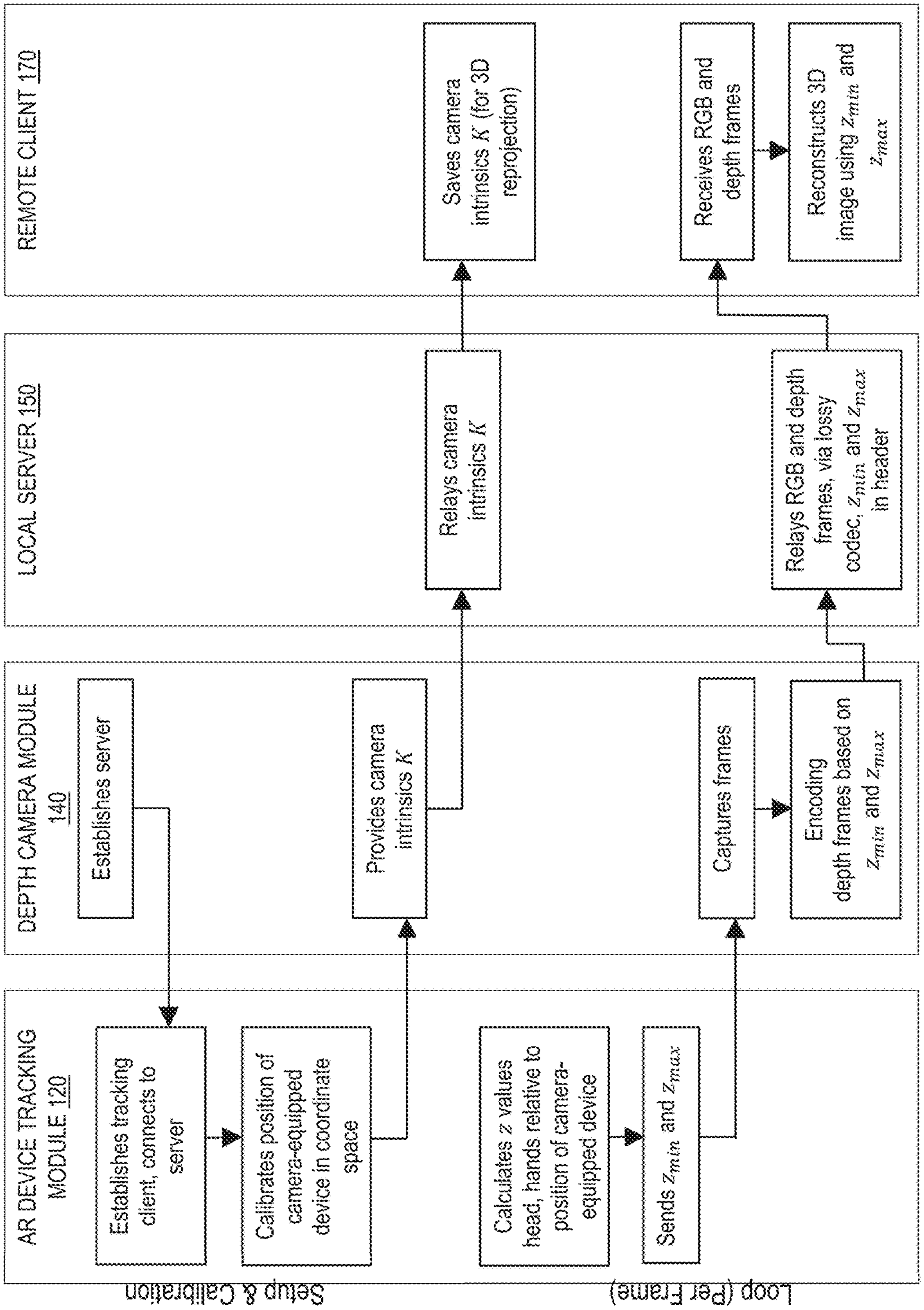
FIG. 3 illustrates an example workflow for the system, in one or more embodiments.

FIG. 3 illustrates an example workflow for the system 550, in one or more embodiments. In one embodiment, each of the AR device tracking module 120, the depth camera module 140, the local server 150, and the remote client 170 has at least two operating phrases: (1) a setup and calibration phase, and (2) an iterative loop phase.

In the setup and calibration phase, the AR device tracking module 120, the depth camera module 140, the local server 150, and the remote client 170 operate as follows: First, the depth camera module 140 establishes a server. Next, the AR device tracking module 120 establishes a tracking client, and connects to the server (established by the depth camera module 140). The AR device tracking module 120 then calibrates a position of the camera-equipped device 130 in 3D coordinate space with three axes, i.e., the x-axis, the y-axis, and the z-axis. Next, the depth camera module 140 provides a set K of intrinsic parameters for the camera ("camera intrinsics") of the camera-equipped device 120 to the local server 150. The local server 150 relays the camera intrinsics K to the remote client 170 over the remote network connection. The remote client 170 caches or saves the camera intrinsics K received from the local server 150. As described in detail later, in the iterative loop phase, the remote client 170 utilizes the camera intrinsics K for 3D reprojection.

In this specification, the terms "depth pixel", "depth value", and "z value" are used interchangeably.

In the iterative loop phase, the AR device tracking module 120, the depth camera module 140, the local server 150, and the remote client 170 operate as follows: For each image frame, the AR device tracking module 120 tracks different parts (e.g., head and hands/feet) of the local user 10, and calculates z values for the different parts relative to the position of the camera-equipped device 130, wherein each z value is a point along the z-axis. Next, the AR device tracking module 120 determines, based on the z values, a reduced depth range in the depth image frame. Specifically, the AR device tracking module 120 determines $z_{min}$ and $z_{max}$, wherein $z_{min}$ and $z_{max}$ are minimum and maximum boundaries of a user volume in the depth image frame. $z_{min}$ and $z_{max}$ represent minimum and maximum distances, respectively, of the body of the local user 10 relative to the z-axis of the camera-equipped device 130. The AR device tracking module 120 sends $z_{min}$ and $z_{max}$ to the depth camera module 140.

In response to receiving $z_{min}$ and $z_{max}$, the depth camera module 140 captures RGB and depth image frames via the camera. The depth camera module 140 then performs an encoding process on the depth image frame captured based on $z_{min}$ and $z_{max}$. The local server 150 applies a lossy codec (e.g., JPEG, H264, or H265) to the RGB image frame and the resulting encoded depth image frame (from the depth camera module 140), and sends/relays, over the remote network connection, the resulting compressed image frames to the remote client 170 as an output stream with $z_{min}$ and $z_{max}$ included in header values. Therefore, instead of transporting all depth values captured within the camera frustum across the network, encoding only the reduced range of depth values culls irrelevant depth values, such that only the relevant depth values are networked. The reduced depth range reduces quantization error, thereby allowing for higher fidelity reconstruction on the remote client 170 and improving perceptual video quality while streaming on the remote AR device 160.

The remote client 170 receives, over the remote network connection, from the local server 150, an input stream comprising the compressed images frames, $z_{min}$, and $z_{max}$. The remote client 170 reconstructs a 3D image based on $z_{min}$ and $z_{max}$, and reprojects the 3D image based on the camera intrinsics K (cached or saved during the setup and calibration phase). The reprojected 3D image is rendered in the AR display of the remote AR device 160.

Simultaneous localization and mapping (SLAM) is a computational technology involving constructing or updating a map of an unknown environment while simultaneously keeping track of an agent's location within it. For example, a device performing SLAM is configured to map its location, create a 3D virtual map, and locate itself inside the map. Visual SLAM is a particular type of SLAM that uses only visual inputs to perform location and mapping. For example, visual SLAM involves calculating the position and orientation of a device with respect to its surroundings, while mapping the environment at the same time, using only visual inputs from a camera.

Figure 4:
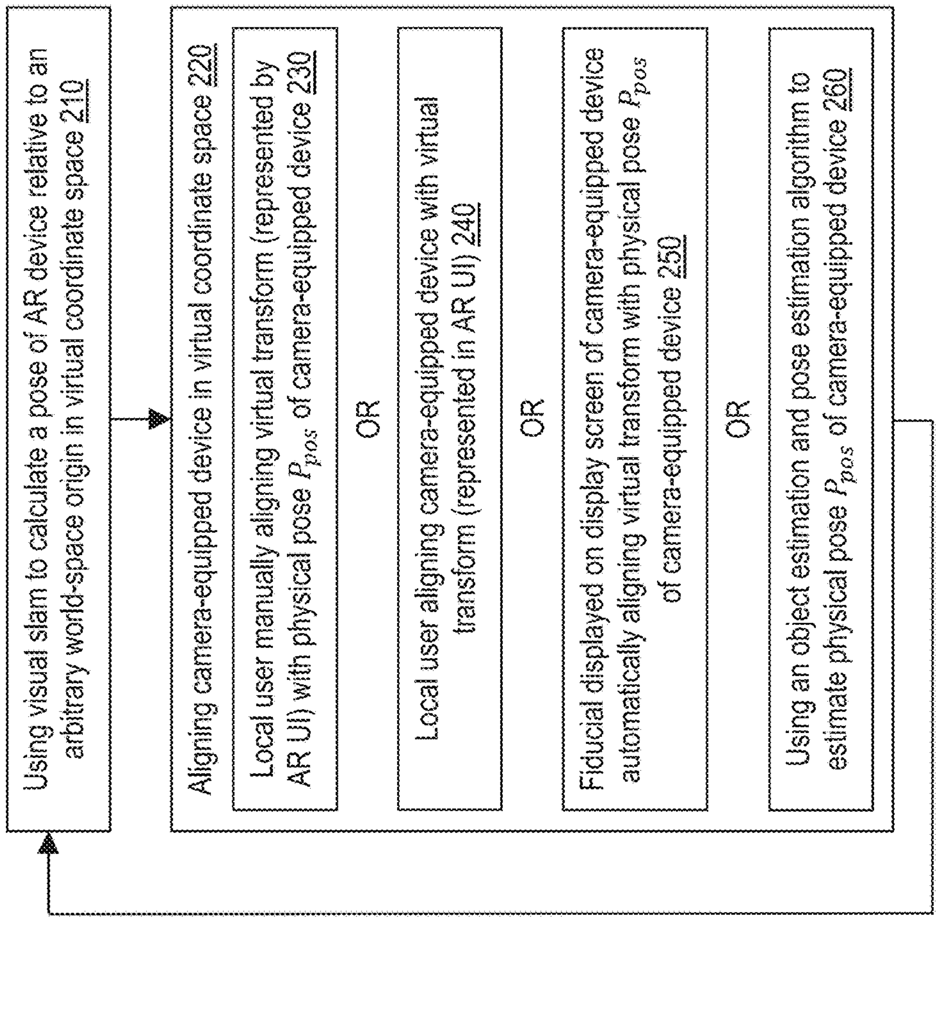
FIG. 4 is a flowchart of an example process for calibrating a position of the camera-equipped device in 3D coordinate space.

FIG. 4 is a flowchart of an example process 200 for calibrating a position of the camera-equipped device 130 in 3D coordinate space, in one or more embodiments. Process block 210 includes using visual slam to calculate a pose of the AR device 110 relative to an arbitrary world-space origin in virtual coordinate space. Process block 220 includes aligning the physical camera-equipped device 130 in the virtual coordinate space. The aligning is performed in accordance with process block 230, process block 240, process block 250, or process block 260.

Process block 230 includes the local user 10 manually aligning a virtual transform represented by an AR user interface (UI) (rendered by the AR device 110) with a physical pose $P_{pos}$ of the camera-equipped device 130.

Process block 240 includes the local user 10 aligning the camera-equipped device 130 with a virtual transform represented in an AR UI (rendered by the AR device 110).

Process block 250 includes a fiducial displayed on a display screen of the camera-equipped device 130 automatically aligning a virtual transform with the physical pose $P_{pos}$ of the camera-equipped device 130.

Process block 260 includes using an object detection and pose estimation algorithm to estimate the physical pose $P_{pos}$ of the camera-equipped device 130.

Each of process block 230, process block 240, process block 250, and process block 260 returns to process block 210.

In one embodiment, process blocks 210-260 are performed by the AR device tracking module 120 during the setup and calibration phase. For example, in one embodiment, the AR device tracking module 120 triggers the AR device 110 to render the AR UI representing the virtual transform. As another example, in one embodiment, the AR device tracking module 120 triggers the camera-equipped device 130 to display the fiducial.

Figure 5:
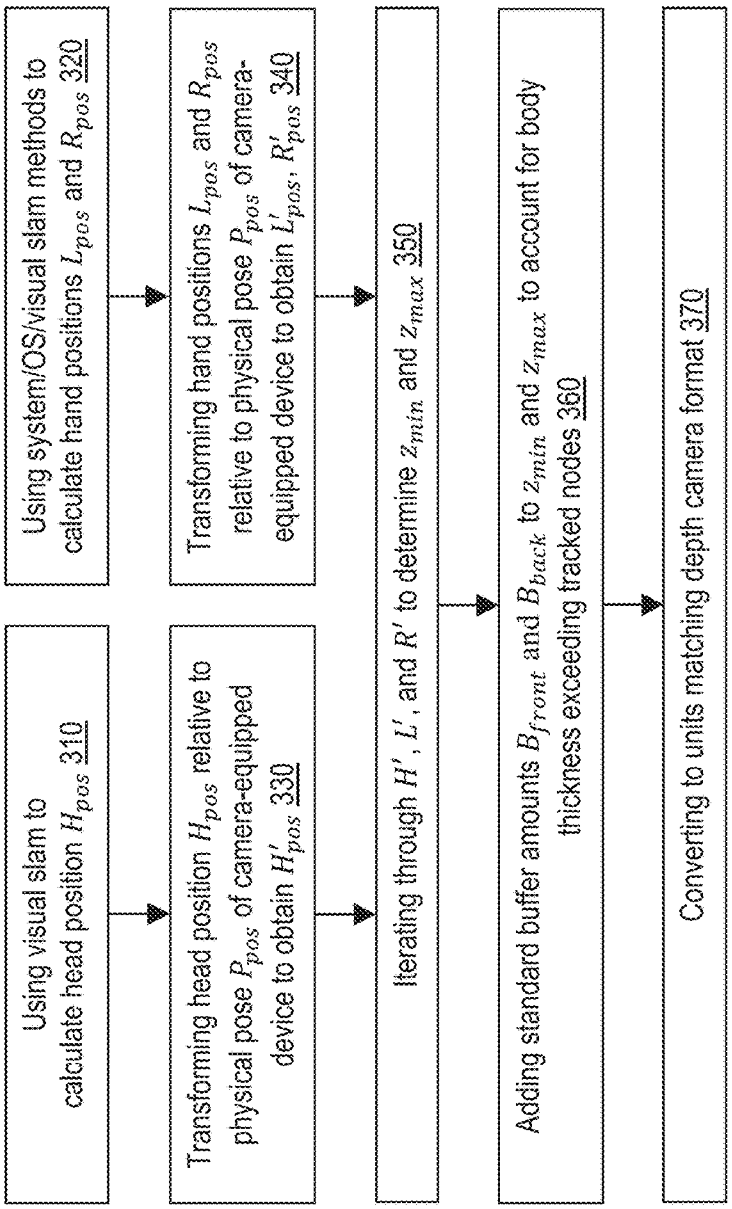
FIG. 5 is a flowchart of an example process for calculating z values for different parts (e.g., head and hands/feet) of the local user relative to the position of the camera-equipped device, in one or more embodiments.

FIG. 5 is a flowchart of an example process 300 for calculating z values for different parts (e.g., head and hands/feet) of the local user 10 relative to the position of the camera-equipped device 130, in one or more embodiments. Process block 310 includes using visual slam to calculate a position $H_{pos}$ of the head ("head position") of the local user 10. Process block 320 includes using system/OS/visual slam methods to calculate positions $L_{pos}$ and $R_{pos}$ of the left hand and right hand ("hand positions") (or the left foot and right foot), respectively, of the local user 10. Process block 330 includes transforming the head position $H_{pos}$ relative to the physical pose $P_{pos}$ of the camera-equipped device 130 to obtain $H'_{pos}$. Process block 340 includes transforming the hand positions $L_{pos}$ and $R_{pos}$ relative to the physical pose $P_{pos}$ of the camera-equipped device 130 to obtain $L'_{pos}$ and $R'_{pos}$.

Process block 350 includes iterating through z components of $H'_{pos}$, $L'_{pos}$, and $R'_{pos}$ to determine $z_{min}$ and $z_{max}$. Process block 360 includes adding standard buffer amounts $B_{front}$ and $B_{back}$ to $z_{min}$ and $z_{max}$ to account for the body thickness of the local user 10 exceeding the tracked parts (i.e., head and hands/feet). Process block 370 includes converting $z_{min}$ and $z_{max}$ to units matching a depth camera format (e.g., m to mm), wherein $z_{min}$ and $z_{max}$ are sent to the depth camera module 140 as the units.

In one embodiment, process blocks 310-370 are performed by the AR device tracking module 120 during the iterative loop phase. For example, in one embodiment, the AR device tracking module 120 is configured to transform the head position $H_{pos}$ relative to the physical pose $P_{pos}$ of the camera-equipped device 130 to obtain $H'_{pos}$, in accordance with equation (1) provided below:

$$H'_{pos}=P_{rot}^{-1}*(H_{pos}-P_{pos}) \quad (1),$$

wherein $P_{rot}^{-1}$ is the inverse of a rotation matrix of the camera-equipped device 130.

As another example, in one embodiment, the AR device tracking module 120 is configured to transform the hand positions $L_{pos}$ and $R_{pos}$ relative to the physical pose $P_{pos}$ of the camera-equipped device 130 to obtain $L'_{pos}$ and $R'_{pos}$, in accordance with equations (2)-(3) provided below:

$$L'_{pos}=P_{rot}^{-1}(L_{pos}-P_{pos}) \quad (2), \text{ and}$$

$$R'_{pos}=P_{rot}^{-1}*(R_{pos}-P_{pos}) \quad (3).$$

As another example, in one embodiment, the AR device tracking module 120 is configured to iterate through z components of $H'_{pos}$, $L'_{pos}$, and $R'_{pos}$ to determine $z_{min}$ and $z_{max}$, in accordance with equations (4)-(5) provided below:

$$z_{min}=\min(H'_{pos_z},L'_{pos_z},R'_{pos_z}) \quad (4), \text{ and}$$

$$z_{max}=\max(H'_{pos_z},L'_{pos_z},R'_{pos_z}) \quad (5).$$

As another example, in one embodiment, the AR device tracking module 120 is configured to add standard buffer amounts $B_{front}$ and $B_{back}$ to $z_{min}$ and $z_{max}$ to account for the body thickness of the local user 10 exceeding the tracked parts (i.e., head and hands/feet), in accordance with equations (6)-(7) provided below:

$$z_{min}=z_{min}+B_{front} \quad (6), \text{ and}$$

$$z_{max}=z_{max}+B_{back} \quad (7)$$

FIG. 6 illustrates an example encoding process, in one or more embodiments. In one embodiment, during each iteration of the iterative loop phase, the depth camera module 140 is configured to receive, as inputs, the following: (1) an array 410 of depth pixels from the depth camera 180, and (2) $z_{min}$ and $z_{max}$ from the AR device tracking module 120. In one embodiment, $z_{min}$ and $z_{max}$ are dynamically set for each depth image frame (e.g., $z_{min}$=900 mm, and $z_{max}$=1500 mm). The array 410 represents a full depth range, i.e., all depth values within the frustum of the depth camera 180. Each element $z_p$ of the array 410 is a measurement of a single depth pixel (e.g., $z_p$=1245 mm).

In one embodiment, the depth camera module 140 is configured to convert the array 410 to a depth image frame by: (1) performing an encoding process on the array 410 based on $z_{min}$ and $z_{max}$, and (2) creating a depth bitmap 420 representing the depth image frame based on encoded values resulting from the encoding process. In one embodiment, the encoding process involves the following operations: For each depth pixel $z_p$ of the array 410, the depth camera module 140 determines a normalized value z' of the depth pixel $z_p$ in accordance with equation (8) provided below:

$$z' = \frac{z_p - z_{min}}{z_{max} - z_{min}}. \quad (8)$$

To reduce a number of bits (i.e., bit depth) representing the normalized value z', the depth camera module 140 performs int8 quantization to convert the normalized value z' from a higher-precision format into an int8 value $z_i$ in a lower-precision format, in accordance with equation (9) provided below:

$$\lfloor z'*2^8 \rceil \approx z_i \quad (9).$$

The depth camera module 140 encodes the int8 value $z_i$ as a 24-bit color value $z_c$, in accordance with equation (10) provided below:

$$(z_i,z_i,z_i)=z_c \quad (10).$$

The depth camera module 140 creates the depth bitmap 420 by setting colors of the depth bitmap 420 that correspond to the depth pixel $z_p$ to the 24-bit color value $z_c$.

For example, if $z_p$=1245 mm, $z_{min}$=900 mm, and $z_{max}$=1500 mm, z'=

$$\frac{1245-900}{1500-900} = 0.575,\ z_i \approx \lfloor 0.575*2^8 \rceil \approx 147, \text{ and } z_c = (147, 147, 147).$$

In one embodiment, the local server 150 is configured to receive, as inputs, the following: (1) a RGB bitmap 400 from the RGB camera 190, wherein the RGB bitmap 400 represents an RGB image frame captured by the RGB camera 190, and (2) the depth bitmap 420 from the depth camera module 140.

In one embodiment, the local server 150 is configured to: (1) compress the RGB bitmap 400 by applying lossy codec to the RGB bitmap 400, resulting in a compressed RGB bitmap 430, and (2) compress the depth bitmap 420 by applying lossy codec to the depth bitmap 420, resulting in a compressed depth bitmap 440.

In one embodiment, the local server 150 is configured to: (1) convert the compressed RGB bitmap 430 into a first byte array 450, and (2) convert the compressed depth bitmap 440 into a second byte array 460 that includes $z_{min}$ and $z_{max}$ as header values, and (3) write the first byte array 450 and the second byte array 460 to an output stream. The output stream is relayed/transported to the remote client 170 over the remote network connection.

Figure 7:
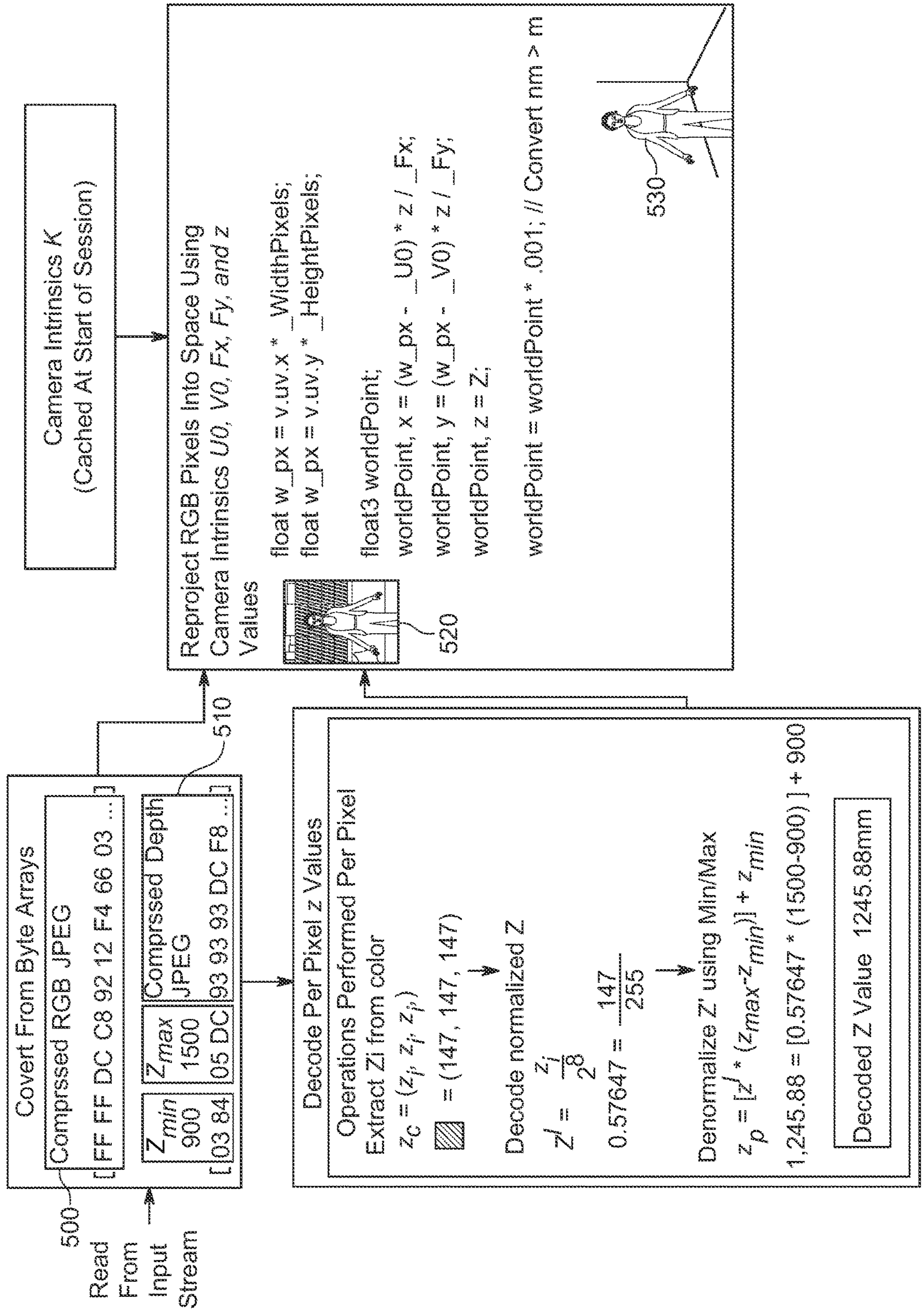
FIG. 7 illustrates an example decoding process, in one or more embodiments.

FIG. 7 illustrates an example decoding process, in one or more embodiments. In one embodiment, during each iteration of the iterative loop phase, the remote client 170 is configured to read, from an input stream, a first byte array 500 and a second byte array 510. The input stream is relayed/transported from the local server 150 over the remote network connection. The second byte array 510 includes $z_{min}$ and $z_{max}$ as header values. The remote client 170 is configured to: (1) convert the first byte array 500 to a RGB bitmap 520 representing an RGB image frame, and (2) convert the second byte array 510 to a depth bitmap representing a depth image frame.

In one embodiment, the remote client 170 is configured to perform a decoding process on the depth bitmap based on $z_{min}$ and $z_{max}$ to obtain decoded z values. In one embodiment, the decoding process involves the following operations: For each 24-bit color value $z_c$ of the depth bitmap, the remote client 170 extracts an int8 value $z_i$ from the 24-bit color value $z_c$, in accordance with equation (11) provided below:

$$z_c=(z_i,z_i,z_i) \tag{11}$$

The remote client 170 decodes a normalized value z' from the int8 value $z_i$, in accordance with equation (12) provided below:

$$z' = \frac{z_i}{2^8}. \tag{12}$$

The remote client 170 de-normalizes the normalized value z' based on $z_{min}$ and $z_{max}$ to obtain a decoded depth pixel $z_p$, in accordance with equation (13) provided below:

$$z_p=[z'*(z_{max}-z_{min})]+z_{min} \tag{13}$$

For example, if $z_c$=147, $z_{min}$=900 mm, and $z_{max}$=1500 mm, $z_i$=147, $$z' = \frac{147}{2^8} = 0.57647, \text{ and } z_p = [0.57647*(1500-900)]+900 = 1245.88 \text{ mm.}$$

In one embodiment, the remote client 170 is configured to perform a 3D reprojection based on RGB bitmap 520, the decoded z values resulting from the decoding process, and the camera intrinsics K of the camera-equipped device 120 (cached/saved at the start of the session). In one embodiment, the 3D reprojection involves the remote client 170 reprojecting RGB pixels from the RGB bitmap 520 into space using the decoded z values and intrinsic parameters from K such as U0, V0, Fx, Fy, resulting in a 3D image 530 of the local user 10 that is rendered on the viewport of the remote AR device 160.

Figure 8:
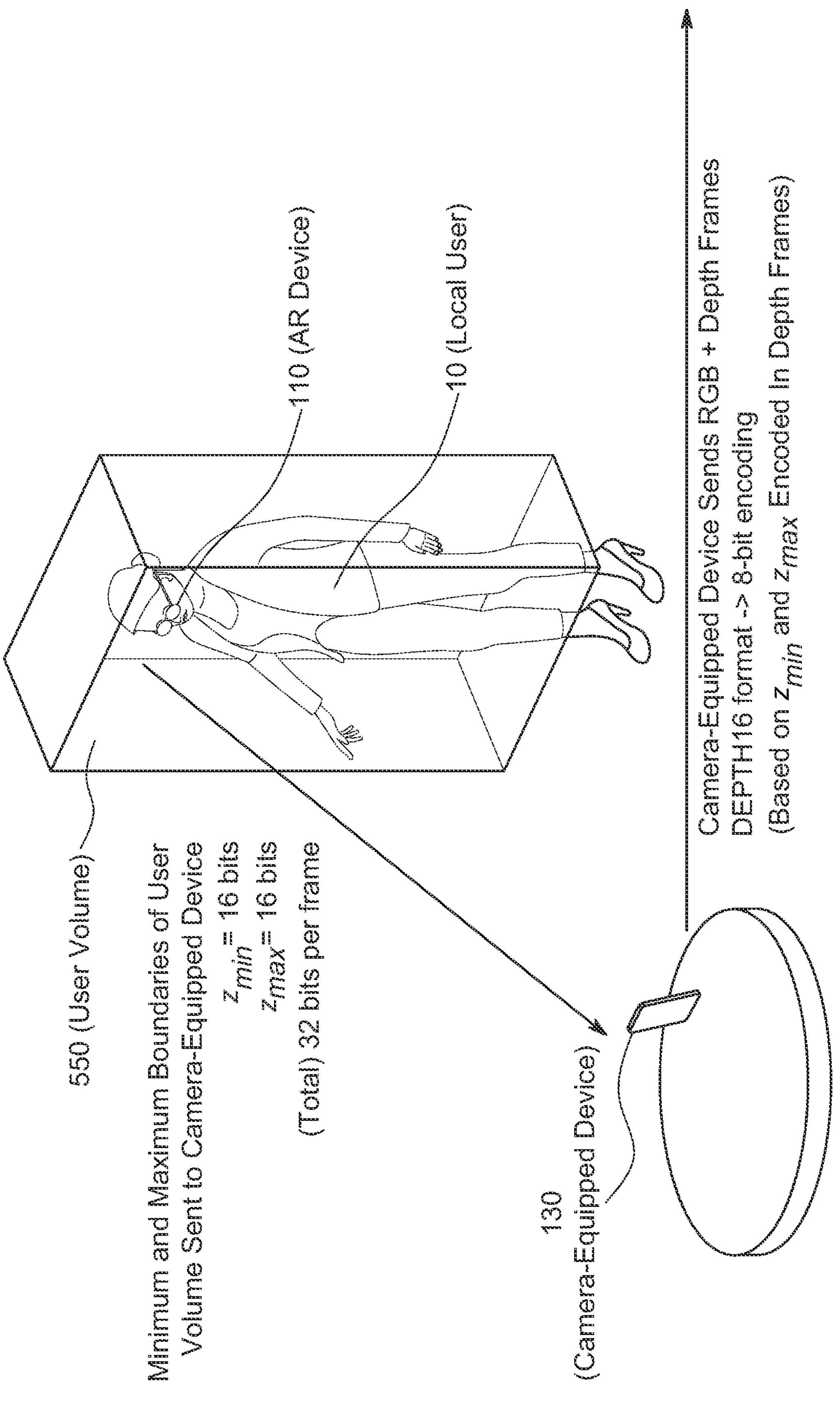
FIG. 8 illustrates an example exchange of data between the AR device and the camera-equipped device, in one or more embodiments.

FIG. 8 illustrates an example exchange of data between the AR device 110 and the camera-equipped device 130, in one or more embodiments. In one embodiment, the AR device tracking module 120 operates on the AR device 110, and the depth camera module 140 and the local server 150 operate on the camera-equipped device 130. In one embodiment, the AR device 110 is a pair of AR glasses worn on the head of the local user 10, and the camera-equipped device 130 is a mobile phone.

The AR device tracking module 120 calculates z values for the head and hands of the local user 10 relative to the position of the camera-equipped device 130, then determines, based on the z values, a user volume 550 encompassing most of the local user 10 including the heads and hands. The user volume represents a reduced depth range containing only relevant depth values (as compared to the full depth range containing all depth values within the frustum of the camera). Specifically, the minimum and maximum boundaries of the user volume are $z_{min}$ and $z_{max}$, wherein $z_{min}$ is a minimum distance of the body of the local user 10 relative to the z-axis of the camera-equipped device 130, and $z_{max}$ is a maximum distance of the body of the local user 10 relative to the z-axis of the camera-equipped device 130. The AR device 110 sends $z_{min}$ and $z_{max}$ (determined by the AR device tracking module 120) to the camera-equipped device 130. In one embodiment, each of $z_{min}$ and $z_{max}$ is 16 bits in size, such that a total size of bits sent from the AR device 110 for each depth image frame is 32 bits.

The camera-equipped device 130 captures RGB and depth image frames via the camera. The depth camera module 140 performs an encoding process on the depth image frame based on $z_{min}$ and $z_{max}$. For example, in one embodiment, the depth camera module 140 performs 8-bit encoding to convert each depth pixel from a higher-precision format (DEPTH16) to a lower-precision format (8-bit). The camera-equipped device 130 sends, via the local server 150, compressed RGB and encoded depth image frames to the remote client 170 over the remote network connection.

As the system 550 utilizes a single calibration-based method that relies only on an exchange of 32 bits per frame (2×int16) over an existing network connection to communicate a reduced depth range, the computational costs of the system 550 is less than conventional CV/AI-based methods (e.g., AI-based methods for real-time human segmentation).

Figure 9A:
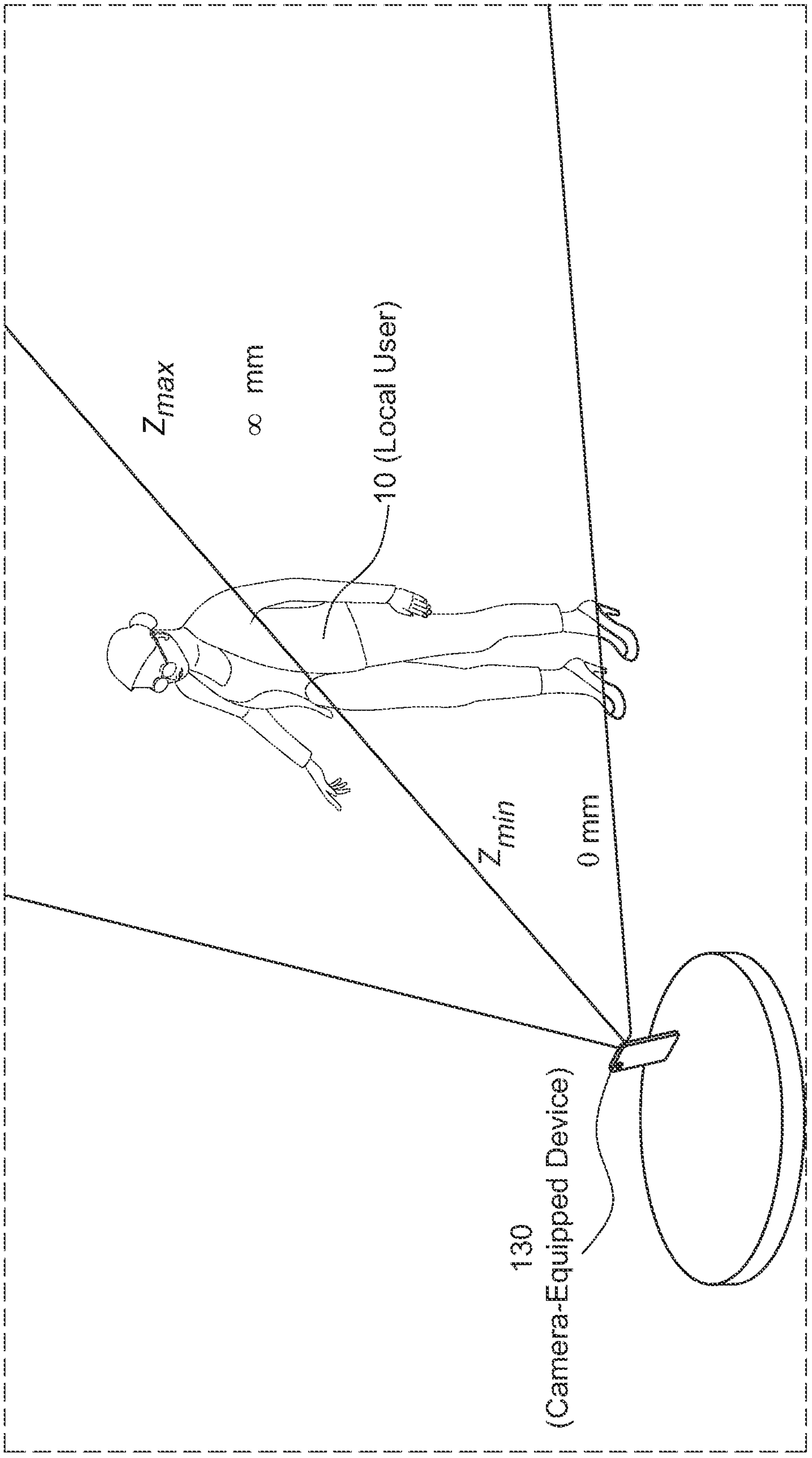
FIG. 9A illustrates an example full depth range, in one or more embodiment.

FIG. 9A illustrates an example full depth range, in one or more embodiments. Before the AR device tracking module 120 reduces depth range by culling irrelevant depth values, the full depth range contains all depth values within the frustum of the camera 137 of the camera-equipped device 130. For example, for the full depth range, $z_{min}$=0 mm and $z_{max}$=∞ mm.

Figure 9B:
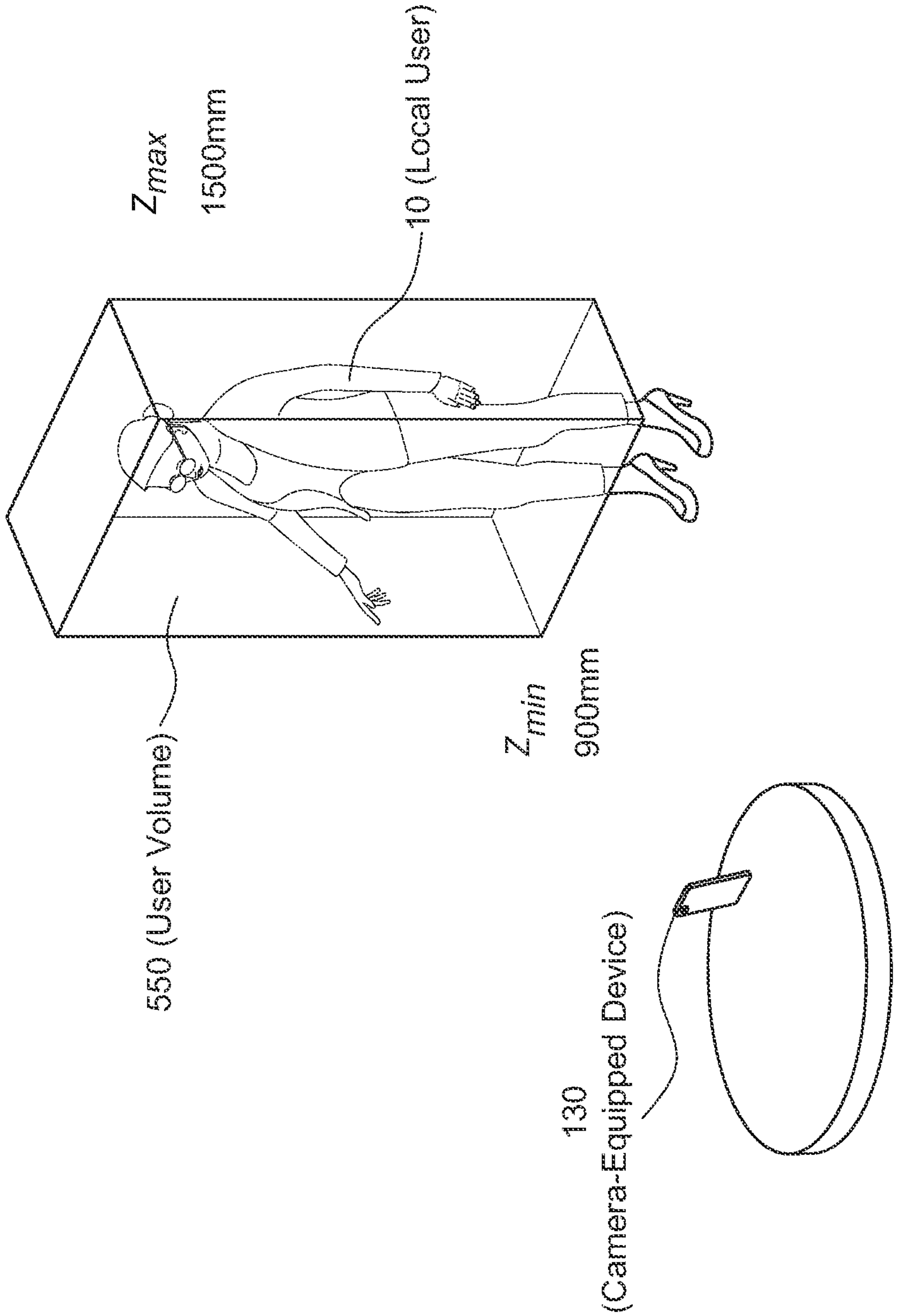
FIG. 9B illustrates an example reduced depth range, in one or more embodiments.

FIG. 9B illustrates an example reduced depth range, in one or more embodiments. The AR device tracking module 120 reduces depth range by culling irrelevant depth values, such that the reduced depth range contains only relevant depth values representing a user volume 550 encompassing most of the body of the local user 10 including the different parts (e.g., head and hands/feet) tracked. For example, for the reduced depth range/user volume, $z_{min}$=900 mm and $z_{max}$=1500 mm.

Figure 10A:
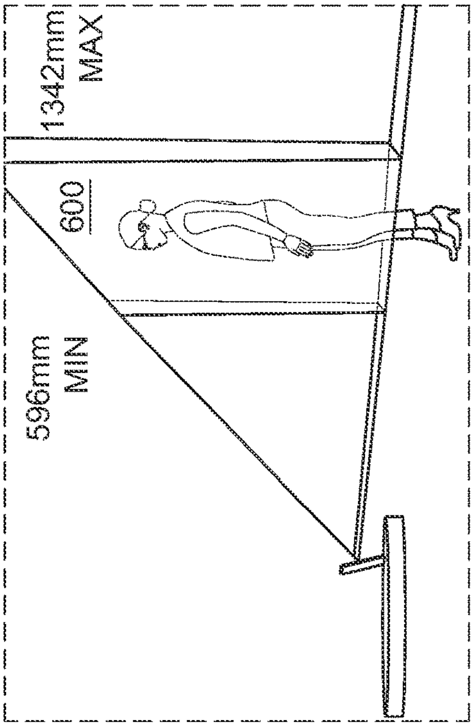
FIG. 10A illustrates an example user volume encompassing the local user at the start of a holocall, in one or more embodiments.

FIGS. 10A-10H illustrate changes to $z_{min}$ and $z_{max}$ during a holocall, in one or more embodiments. FIG. 10A illustrates an example user volume 600 encompassing the local user 10 at the start of a holocall, in one or more embodiments. As shown in FIG. 10A, at the start of the holocall, the hands of the local user 10 are lowered and positioned on the sides of the body of the local user 10. The AR device tracking module 120 determines minimum and maximum boundaries of the user volume 600 as follows: $z_{min}$=596 mm, and $z_{max}$=1342 mm.

Figure 10B:
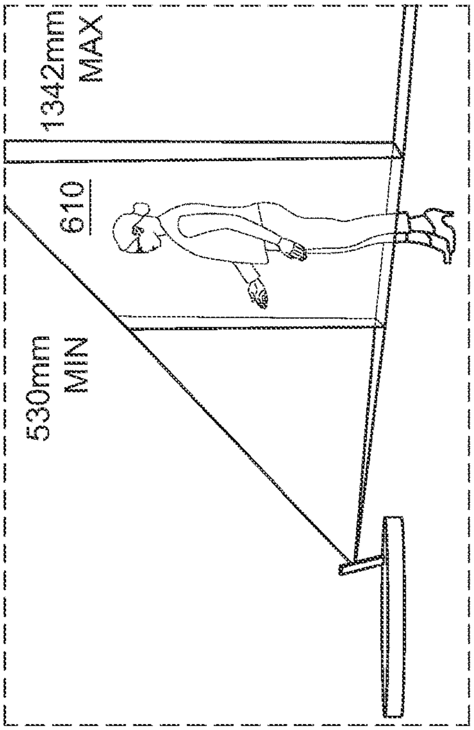
FIG. 10B illustrates another example user volume encompassing the local user raising a hand during the holocall, in one or more embodiments.

FIG. 10B illustrates another example user volume 610 encompassing the local user 10 raising a hand during the holocall, in one or more embodiments. As shown in FIG. 10B, when the local user 10 raises a hand during the holocall, the minimum distance of the body of the local user 10 relative to the z-axis of the camera-equipped device 130 decreases, resulting in a larger/wider user volume 610 that encompasses the raised hand. The AR device tracking module 120 determines minimum and maximum boundaries of the user volume 610 as follows: $z_{min}$=530 mm, and $z_{max}$=1342 mm.

Figure 10C:
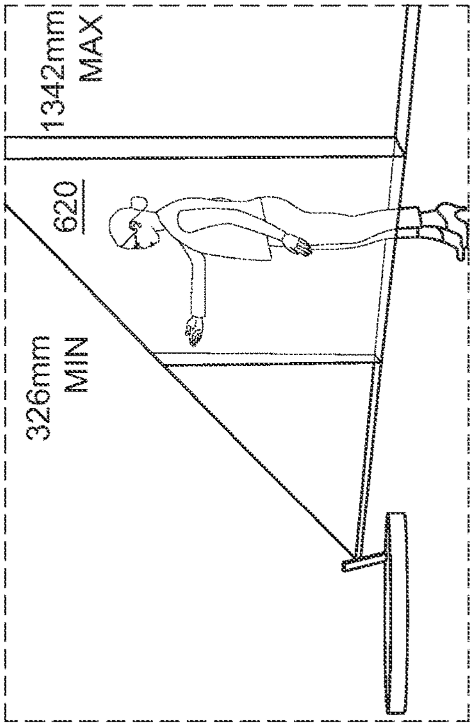
FIG. 10C illustrates another example user volume encompassing the local user with a hand extended forward during the holocall, in one or more embodiments.

FIG. 10C illustrates another example user volume 620 encompassing the local user 10 with a hand extended forward during the holocall, in one or more embodiments. As shown in FIG. 10C, when the local user 10 extends a hand forward during the holocall, the minimum distance of the body of the local user 10 relative to the z-axis of the camera-equipped device 130 decreases even further, resulting in an even larger/wider user volume 620 that encompasses the extended hand. The AR device tracking module 120 determines minimum and maximum boundaries of the user volume 620 as follows: $z_{min}$=3260 mm, and $z_{max}$=1342 mm.

Figure 10D:
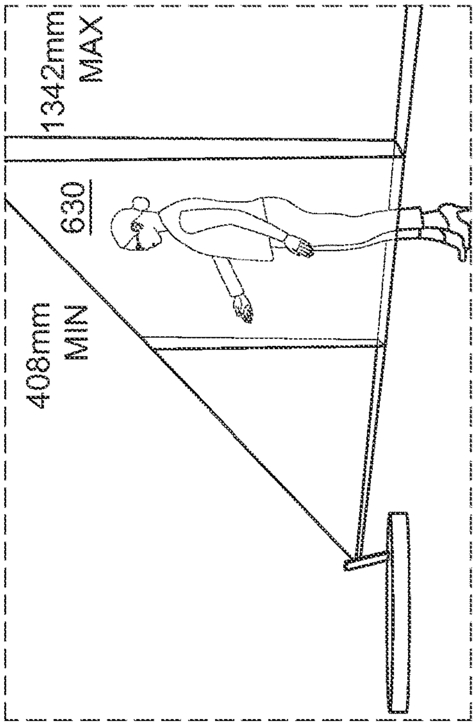
FIG. 10D illustrates another example user volume encompassing the local user lowering a raised hand during the holocall, in one or more embodiments.

FIG. 10D illustrates another example user volume 630 encompassing the local user 10 lowering a raised hand during the holocall, in one or more embodiments. As shown in FIG. 10D, when the local user 10 lowers a raised hand during the holocall, the minimum distance of the body of the local user 10 relative to the z-axis of the camera-equipped device 130 increases, resulting in a smaller/narrower user volume 630 that encompasses the lowered hand. The AR device tracking module 120 determines minimum and maximum boundaries of the user volume 630 as follows: $z_{min}$=408 mm, and $z_{max}$=1342 mm.

Figure 10E:
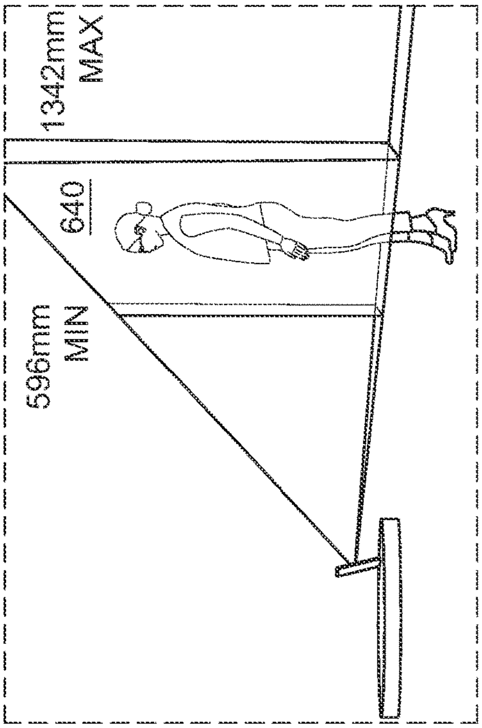
FIG. 10E illustrates another example user volume encompassing the local user positioning a lowered hand on the side of the body of the local user during the holocall, in one or more embodiments.

FIG. 10E illustrates another example user volume 640 encompassing the local user 10 positioning a lowered hand on the side of the body of the local user 10 during the holocall, in one or more embodiments. As shown in FIG. 10E, when the local user 10 positions a lowered hand on the side of the body of the local user 10 during the holocall, the minimum distance of the body of the local user 10 relative to the z-axis of the camera-equipped device 130 increases even further, resulting in a smaller/narrower user volume 640. The AR device tracking module 120 determines minimum and maximum boundaries of the user volume 640 as follows: $z_{min}$=596 mm, and $z_{max}$=1342 mm.

Figure 10F:
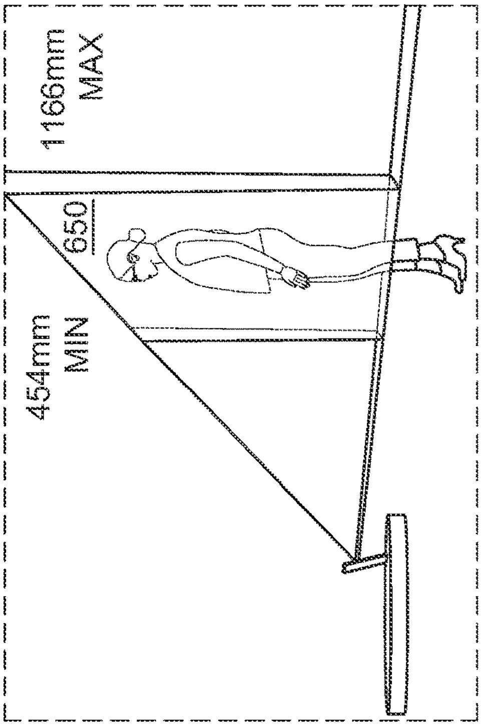
FIG. 10F illustrates another example user volume encompassing the local user moving closer forward to the camera-equipped device during the holocall, in one or more embodiments.

FIG. 10F illustrates another example user volume 650 encompassing the local user 10 moving closer forward to the camera-equipped device 130 during the holocall, in one or more embodiments. As shown in FIG. 10F, when the local user 10 moves closer forward to the camera-equipped device 130 during the holocall, both the minimum and maximum distance of the body of the local user 10 relative to the z-axis of the camera-equipped device 130 decrease. The AR device tracking module 120 determines minimum and maximum boundaries of the user volume 650 as follows: $z_{min}$=454 mm, and $z_{max}$=1166 mm.

Figure 10G:
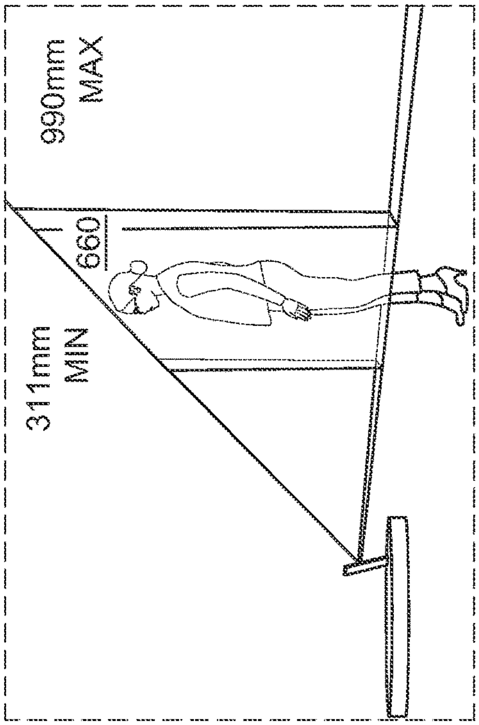
FIG. 10G illustrates another example user volume encompassing the local user moving further closer forward to the camera-equipped device during the holocall, in one or more embodiments.

FIG. 10G illustrates another example user volume 660 encompassing the local user 10 moving further closer forward to the camera-equipped device 130 during the holocall, in one or more embodiments. As shown in FIG. 10G, when the local user 10 moves further closer forward to the camera-equipped device 130 during the holocall, both the minimum and maximum distance of the body of the local user 10 relative to the z-axis of the camera-equipped device 130 decrease even further. The AR device tracking module 120 determines minimum and maximum boundaries of the user volume 660 as follows: $z_{min}$=311 mm, and $z_{max}$=990 mm.

Figure 10H:
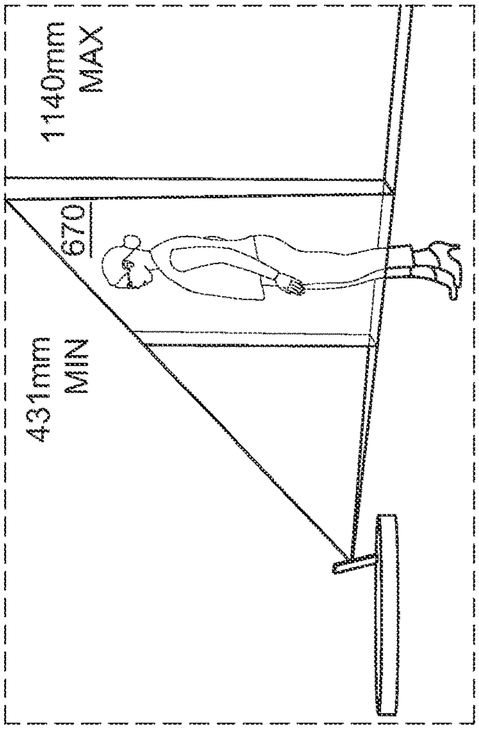
FIG. 10H illustrates another example user volume encompassing the local user moving further backwards from the camera-equipped device during the holocall, in one or more embodiment.

FIG. 10H illustrates another example user volume 670 encompassing the local user 10 moving further backwards from the camera-equipped device 130 during the holocall, in one or more embodiments. As shown in FIG. 10H, when the local user 10 moves further backwards from the camera-equipped device 130 during the holocall, both the minimum and maximum distance of the body of the local user 10 relative to the z-axis of the camera-equipped device 130 increase. The AR device tracking module 120 determines minimum and maximum boundaries of the user volume 670 as follows: $z_{min}$=431 mm, and $z_{max}$=1140 mm.

Figure 11:
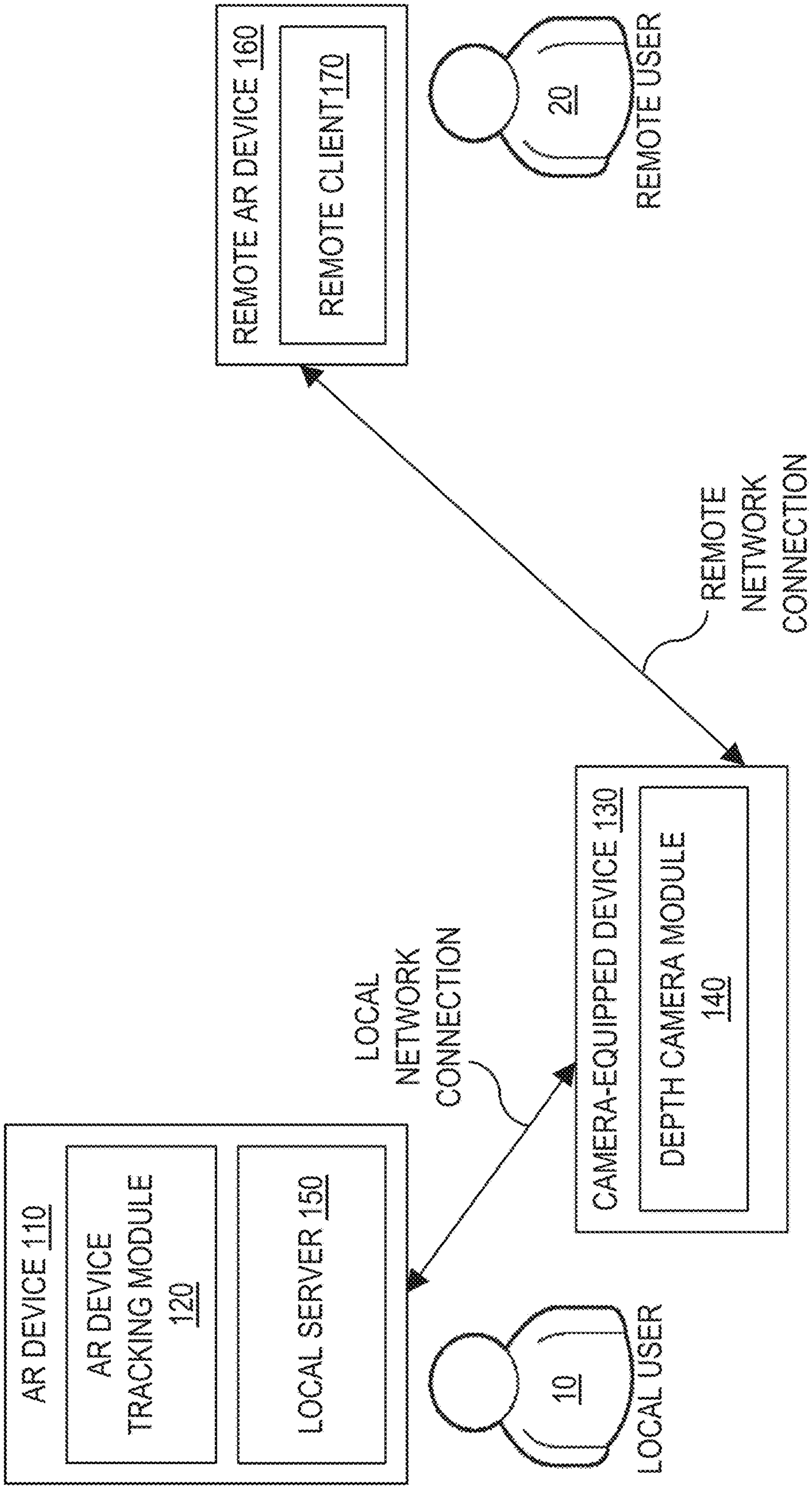
FIG. 11 illustrates another example system for efficient encoding of depth data across devices, in one or more embodiments.

FIG. 11 illustrates another example system 560 for efficient encoding of depth data across devices, in one or more embodiments. In one embodiment, the system 560 splits computation between the AR device 110 and the camera-equipped device 130. Specifically, in the system 560, the one or more applications 116 (FIG. 1) on the AR device 100 include the AR device tracking module 120 and the local server 150, the one or more applications 136 (FIG. 1) on the camera-equipped device 130 include the depth camera module 140, and the one or more applications 166 (FIG. 1) on the remote AR device 160 include the remote client 170.

Figure 12:
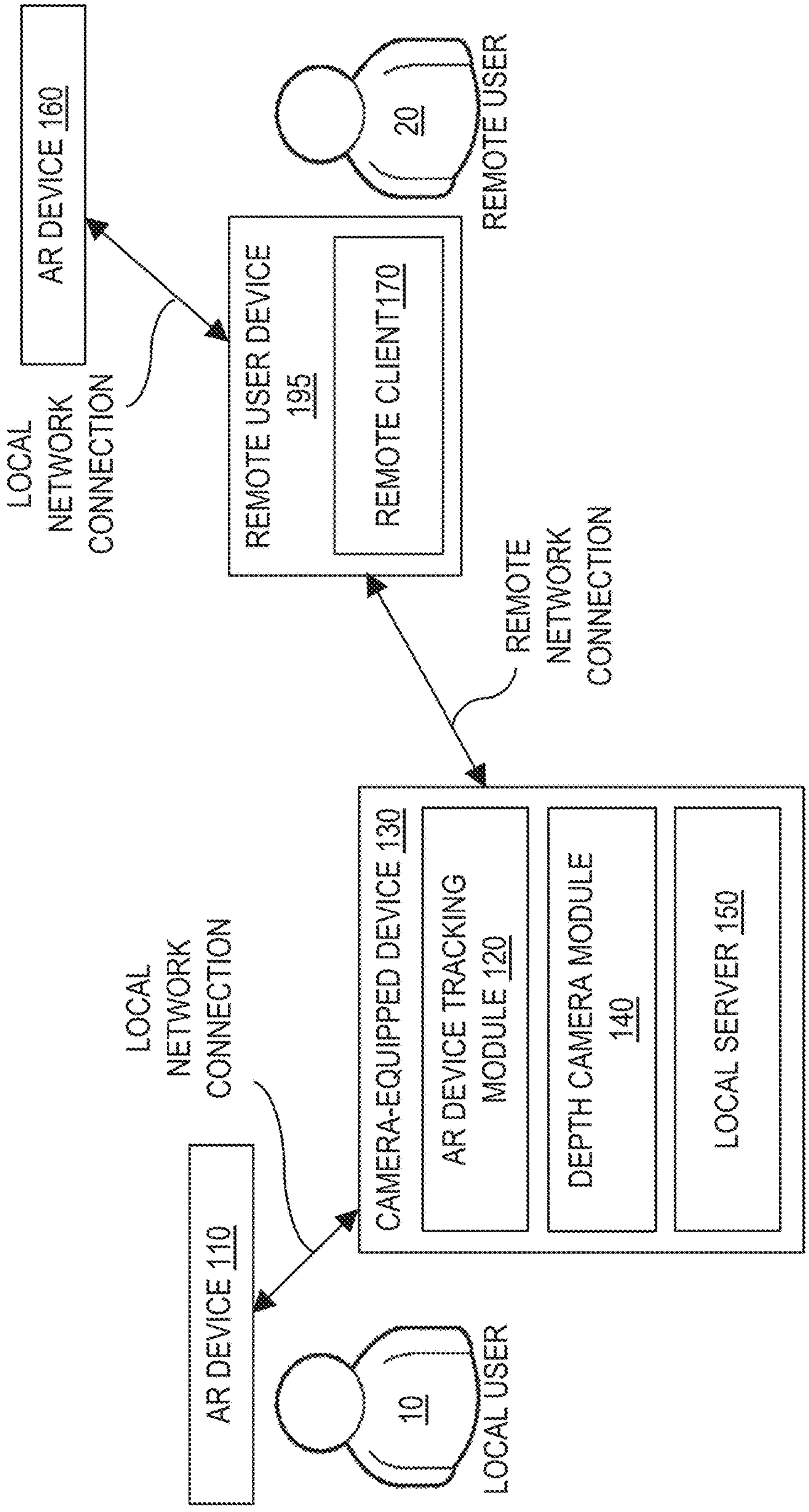
FIG. 12 illustrates another example system for efficient encoding of depth data across devices, in one or more embodiments.

FIG. 12 illustrates another example system 570 for efficient encoding of depth data across devices, in one or more embodiments. In one embodiment, the system 560 performs most computation on the camera-equipped device 130. Specifically, in the system 570, the one or more applications 136 (FIG. 1) on the camera-equipped device 130 include the AR device tracking module 120, the depth camera module 140, and the local server 150. Further, the system 570 includes a remote user device 195 on which the remote client 170 executes/operates. The AR device 110 relays sensor data to the AR device tracking module 120 on the camera-equipped device 130 over the local network connection. The remote AR device 160 receives a 3D image (reconstructed by the remote client 170) from the remote user device 195 over a local network connection, and renders the 3D image on the AR display of the remote AR device 160.

FIG. 13 is a flowchart of an example process 800 for efficient encoding of depth data across devices, in one or more embodiments. Process block 810 includes determining a spatial relationship between an AR device (e.g., AR device 110) and a camera-equipped device (e.g., camera-equipped device 130), wherein the AR device is worn by a user (e.g., local user 10), and the camera-equipped device is positioned within proximity of the user. Process block 820 includes determining, based on the spatial relationship, minimum and maximum boundaries ($z_{min}$ and $z_{max}$) of a user volume encompassing a head and one or more extremities of the user, wherein the minimum and maximum boundaries represent a reduced depth range that is narrower than a full depth range of a camera frustum of the camera-equipped device. Process block 830 includes encoding, based on the minimum and maximum boundaries, a depth image frame captured via the camera-equipped device. Process block 840 includes transmitting the encoded depth image frame over a remote network connection, wherein a reconstructed 3D image based in part on the encoded depth image frame is rendered by a different AR device (e.g., remote AR device 160).

In one embodiment, process blocks 810-840 may be performed one or more components of the system 550, 560, 570, such as the AR device tracking module 120, the depth camera module 140, the local server 150, and the remote client 170.

Figure 14:
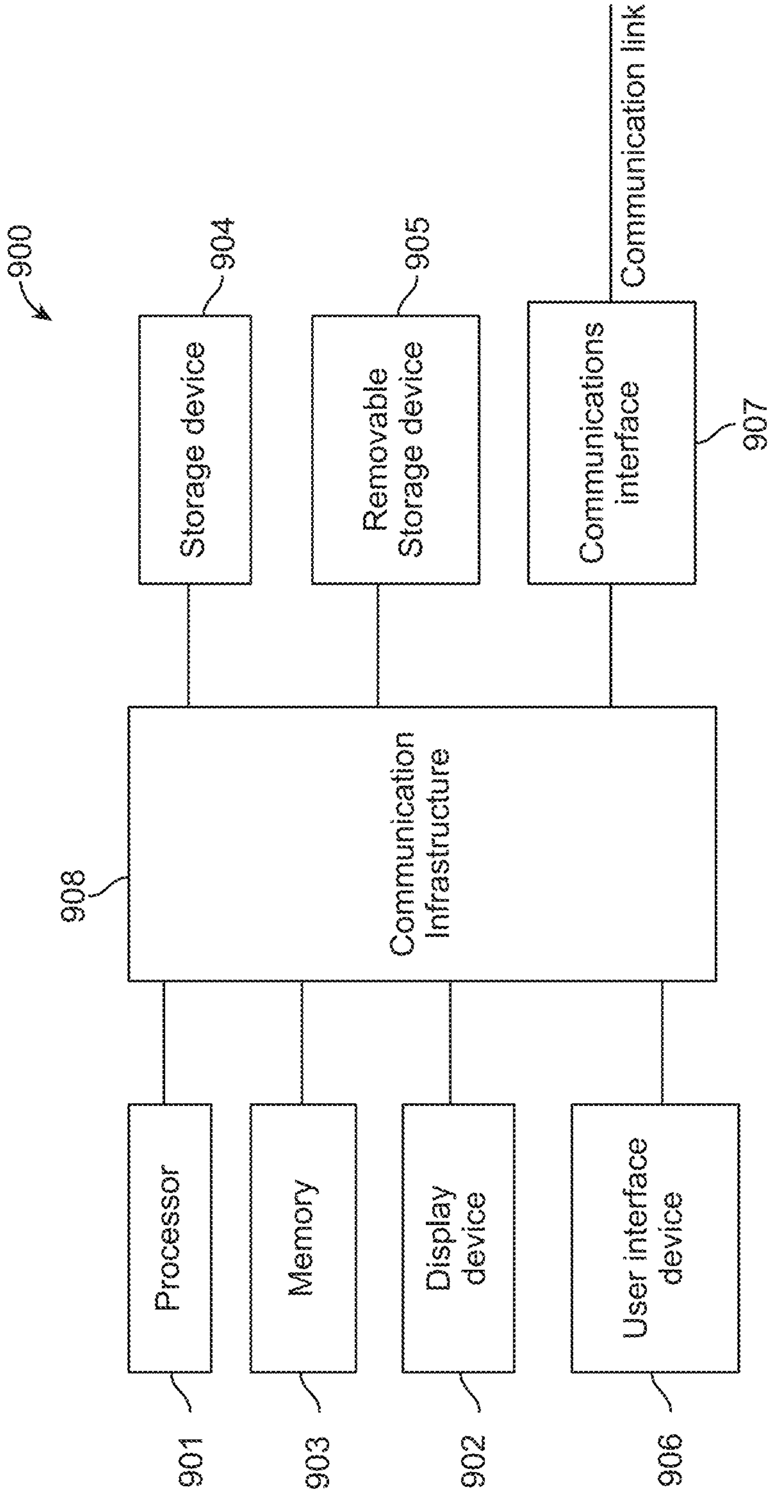
FIG. 14 is an exemplary high-level block diagram showing an information processing system comprising a computer system useful for implementing disclosed embodiments.

FIG. 14 is a high-level block diagram showing an information processing system comprising a computer system 900 useful for implementing the disclosed embodiments. Computer system 900 may be incorporated the AR device 110, the camera-equipped device 130, the remote AR device 160, and/or the remote user device 195. The computer system 900 includes one or more processors 901, and can further include an electronic display device 902 (for displaying video, graphics, text, and other data), a main memory 903 (e.g., random access memory (RAM)), storage device 904 (e.g., hard disk drive), removable storage device 905 (e.g., removable storage drive, removable memory module, a magnetic tape drive, optical disk drive, computer readable medium having stored therein computer software and/or data), viewer interface device 906 (e.g., keyboard, touch screen, keypad, pointing device), and a communication interface 907 (e.g., modem, a network interface (such as an Ethernet card), a communications port, or a Personal Computer Memory Card International Association (PCMCIA) slot and card). The communication interface 907 allows software and data to be transferred between the computer system and external devices. The system 900 further includes a communications infrastructure 908 (e.g., a communications bus, cross-over bar, or network) to which the aforementioned devices/modules 901 through 907 are connected.

Information transferred via communications interface 907 may be in the form of signals such as electronic, electromagnetic, optical, or other signals capable of being received by communications interface 907, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 200 (FIG. 4), processing instructions for process 300 (FIG. 5), and/or processing instructions for process 800 (FIG. 13) may be stored as program instructions on the memory 903, storage device 904 and the removable storage device 905 for execution by the processor 901.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, Read Only Memory (ROM), flash memory, disk drive memory, a Compact Disc-ROM (CD-ROM), and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable CD-ROM, an optical storage device, a magnetic storage device, or any suitable combination of the foregoing. In the context of this document, a computer readable storage medium may be any tangible medium that can contain, or store a program for use by or in connection with an instruction execution system, apparatus.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method, comprising:

determining a spatial relationship between an augmented reality (AR) device and a camera-equipped device, wherein the AR device is worn by a user, and the camera-equipped device is positioned within proximity of the user;

determining, based on the spatial relationship, minimum and maximum boundaries of a user volume encompassing a head and one or more extremities of the user, wherein the minimum and maximum boundaries represent a reduced depth range that is narrower than a full depth range of a camera frustum of the camera-equipped device;

encoding, based on the minimum and maximum boundaries, a depth image frame captured via the camera-equipped device; and transmitting the encoded depth image frame over a remote network connection, wherein a reconstructed three-dimensional (3D) image based in part on the encoded depth image frame is rendered by a different AR device.

2. The method of claim 1, wherein determining the spatial relationship comprises:

determining a set of depth values representing distances of the head and the one or more extremities of the user relative to a z-axis of the camera-equipped device, wherein the minimum and maximum boundaries are based on the set of depth values.

3. The method of claim 1, further comprising:

for each subsequent depth image frame captured via the camera-equipped device:

determining an updated set of depth values representing distances of the head and the one or more extremities of the user relative to the z-axis of the camera-equipped device;

dynamically updating the minimum and maximum boundaries based on the update set of depth values; and encoding the subsequent depth image frame based on the updated minimum and maximum boundaries.

4. The method of claim 1, wherein the minimum and maximum boundaries are included in header values of the encoded depth image frame.

5. The method of claim 1, wherein the one or more extremities of the user include at least one of a left hand, a right hand, a left foot, or a right foot of the user.

6. The method of claim 1, wherein each AR device comprises a pair of AR glasses.

7. The method of claim 1, wherein the camera-equipped device includes a Red, Green and Blue (RGB) camera and a depth camera.

8. The method of claim 1, wherein the AR device is paired with the camera-equipped device over a local network connection.

9. A system, comprising:

at least one processor; and a non-transitory processor-readable memory device storing instructions that when executed by the at least one processor causes the at least one processor to perform operations including:

determining a spatial relationship between an augmented reality (AR) device and a camera-equipped device paired with the AR device over a local network connection, wherein the AR device is worn by a user, and the camera-equipped device is positioned within proximity of the user;

determining, based on the spatial relationship, minimum and maximum boundaries of a user volume encompassing a head and one or more extremities of the user, wherein the minimum and maximum boundaries represent a reduced depth range that is narrower than a full depth range of a camera frustum of the camera-equipped device;

encoding, based on the minimum and maximum boundaries, a depth image frame captured via the camera-equipped device; and transmitting the encoded depth image frame over a remote network connection, wherein a reconstructed three-dimensional (3D) image based in part on the encoded depth image frame is rendered by a different AR device.

10. The system of claim 9, wherein determining the spatial relationship comprises:

determining a set of depth values representing distances of the head and the one or more extremities of the user relative to a z-axis of the camera-equipped device, wherein the minimum and maximum boundaries are based on the set of depth values.

11. The system of claim 9, wherein the operations further comprise:

for each subsequent depth image frame captured via the camera-equipped device:

determining an updated set of depth values representing distances of the head and the one or more extremities of the user relative to the z-axis of the camera-equipped device;

dynamically updating the minimum and maximum boundaries based on the update set of depth values; and encoding the subsequent depth image frame based on the updated minimum and maximum boundaries.

12. The system of claim 9, wherein the minimum and maximum boundaries are included in header values of the encoded depth image frame.

13. The system of claim 9, wherein the one or more extremities of the user include at least one of a left hand, a right hand, a left foot, or a right foot of the user.

14. The system of claim 9, wherein each AR device comprises a pair of AR glasses.

15. The system of claim 9, wherein the camera-equipped device includes a Red, Green and Blue (RGB) camera and a depth camera.

16. A non-transitory computer readable storage medium including instructions to perform a method comprising:

determining a spatial relationship between an augmented reality (AR) device and a camera-equipped device paired with the AR device over a local network connection, wherein the AR device is worn by a user, and the camera-equipped device is positioned within proximity of the user;

determining, based on the spatial relationship, minimum and maximum boundaries of a user volume encompassing a head and one or more extremities of the user, wherein the minimum and maximum boundaries represent a reduced depth range that is narrower than a full depth range of a camera frustum of the camera-equipped device;

encoding, based on the minimum and maximum boundaries, a depth image frame captured via the camera-equipped device; and transmitting the encoded depth image frame over a remote network connection, wherein a reconstructed three-dimensional (3D) image based in part on the encoded depth image frame is rendered by a different AR device.

17. The computer program product of claim 16, wherein determining the spatial relationship comprises:

determining a set of depth values representing distances of the head and the one or more extremities of the user relative to a z-axis of the camera-equipped device, wherein the minimum and maximum boundaries are based on the set of depth values.

18. The computer program product of claim 16, wherein the method further comprises:

for each subsequent depth image frame captured via the camera-equipped device:

determining an updated set of depth values representing distances of the head and the one or more extremities of the user relative to the z-axis of the camera-equipped device;

dynamically updating the minimum and maximum boundaries based on the update set of depth values; and encoding the subsequent depth image frame based on the updated minimum and maximum boundaries.

19. The computer program product of claim 16, wherein the minimum and maximum boundaries are included in header values of the encoded depth image frame.

20. The computer program product of claim 16, wherein the one or more extremities of the user include at least one of a left hand, a right hand, a left foot, or a right foot of the user.

* * * * *